United States Patent
Shimono et al.

(10) Patent No.: US 9,296,570 B2
(45) Date of Patent: Mar. 29, 2016

(54) POWDER SUPPLY DEVICE AND POWDER SUPPLY METHOD

(71) Applicant: DIAMOND ENGINEERING CO., LTD., Toyama (JP)

(72) Inventors: Kimihiro Shimono, Toyama (JP); Takahiro Takeda, Toyama (JP); Kazutoshi Teraoka, Toyama (JP); Fumihito Kasagi, Toyama (JP)

(73) Assignee: DIAMOND ENGINEERING CO., LTD., Toyama (JP)

( * ) Notice: Subject to any disclaimer, the term of this patent is extended or adjusted under 35 U.S.C. 154(b) by 0 days.

(21) Appl. No.: 14/349,490

(22) PCT Filed: Oct. 4, 2012

(86) PCT No.: PCT/JP2012/075743
§ 371 (c)(1),
(2) Date: Apr. 3, 2014

(87) PCT Pub. No.: WO2013/061745
PCT Pub. Date: May 2, 2013

(65) Prior Publication Data
US 2014/0234034 A1     Aug. 21, 2014

(30) Foreign Application Priority Data
Oct. 25, 2011     (JP) .................................. 2011-234321

(51) Int. Cl.
*B65G 53/06*     (2006.01)
*B65G 53/40*     (2006.01)
(Continued)

(52) U.S. Cl.
CPC ................ *B65G 53/06* (2013.01); *B65G 53/40* (2013.01); *B65G 53/66* (2013.01); *F23K 3/02* (2013.01);
(Continued)

(58) Field of Classification Search
CPC .......... B65G 53/40; B65G 53/66; F23K 3/00; F23K 2203/006; F23K 3/103; F23K 3/104; F23K 2203/103; F23K 2203/104; G01G 11/086; G01G 11/08; G01G 13/00; G01G 13/16; F27D 3/18; F27D 3/0033
USPC ................................. 222/1, 52, 55–56, 58, 77
See application file for complete search history.

(56) References Cited

U.S. PATENT DOCUMENTS 4,880,142 A * 11/1989 Higuchi et al. ................. 222/56
5,285,735 A     2/1994 Motoi et al.
(Continued)

FOREIGN PATENT DOCUMENTS

| CN | 201321285 | 10/2009 |
| CN | 101628666 | 1/2010 |

(Continued)

OTHER PUBLICATIONS

U.S. Appl. No. 14/241,236 to Kimihiro Shimono et al., filed Feb. 26, 2014.
(Continued)

*Primary Examiner* — Frederick C Nicolas
(74) *Attorney, Agent, or Firm* — Greenblum & Bernstein, P.L.C.

(57) ABSTRACT

A powder supply device includes a controller configured to receive an output from a load cell and an output from a pressure indicator, wherein the controller obtains a powder weight or a rate of change in the powder weight in a feed tank on the basis of a value obtained by subtracting a value proportional to the output from the pressure indicator from the output from the load cell and controls the flow rate of the powder to be supplied to outside of the feed tank on the basis of the powder weight or the rate of change in powder weight in the state in which a closing valve is closed.

26 Claims, 6 Drawing Sheets

(51) Int. Cl.
*B65G 53/66* (2006.01)
*F23K 3/02* (2006.01)
*G01G 13/00* (2006.01)
*G01G 11/08* (2006.01)

(52) U.S. Cl.
CPC ..... *F23K 2203/103* (2013.01); *F23K 2203/104* (2013.01); *G01G 11/08* (2013.01); *G01G 11/086* (2013.01); *G01G 13/00* (2013.01)

(56) References Cited

U.S. PATENT DOCUMENTS

| 5,854,446 | A | * | 12/1998 | Tatsuoka et al. | 177/17 |
| 2013/0320049 | A1 | * | 12/2013 | Shimono et al. | 222/630 |
| 2014/0203038 | A1 | * | 7/2014 | Shimono et al. | 222/1 |
| 2015/0021358 | A1 | * | 1/2015 | Shimono et al. | 222/55 |

FOREIGN PATENT DOCUMENTS

| JP | 57-156923 | 9/1982 |
| JP | 06115690 | 4/1994 |
| JP | 11-79395 | 3/1999 |

OTHER PUBLICATIONS

International Search Report issued Dec. 25, 2012 in PCT/JP2012/075743.

Chinese Office Action (with English language translation) mailed on Mar. 6, 2015 and issued in counterpart Chinese application 201280052282.9.

* cited by examiner

| POWDER FLOW RATE SV [l/h] | POWDER VALVE APERTURE [%] | DIFFERENTIAL PRESSURE [Mpa] |
|---|---|---|
| 0.1 | 50 | 0.01 |
| 0.5 | 60 | 0.03 |
| 1.0 | 80 | 0.05 |
| 1.5 | 100 | 0.06 |

… (1)

POWDER SUPPLY DEVICE AND POWDER SUPPLY METHOD

TECHNICAL FIELD

The present invention relates to a powder supply device and a powder supply method, and more particularly to a powder supply device and a powder supply method capable of controlling, with improved accuracy, the flow rate of powder to be supplied.

BACKGROUND ART

Combustion furnaces for burning pulverized fuel such as pulverized coal supplied from powder supply devices are known as combustion furnaces used in blast furnace facilities, thermal power plants, and the like. A technique of burning pulverized fuel in such a combustion furnace while spraying the fuel together with air into the combustion furnace is known. Such a burning method using pulverized coal is widely used for such reasons as higher economical efficiency of coal than those of petroleum and LPG (liquefied petroleum gas).

A gas-carried powder supply device that conveys pulverized fuel with carrier gas is known as a powder supply device for supplying pulverized fuel to a combustion furnace. In such a powder supply device, the pulverized fuel in a feed tank is supplied to a powder delivery pipe and conveyed by the carrier gas therein. In general, the supply rate (flow rate) per unit time of the pulverized fuel into the powder delivery pipe is controlled according to the aperture of a powder discharge valve provided at an outlet in a bottom portion of the feed tank and the differential pressure between the pressure in the feed tank and the pressure in the powder delivery pipe (see, for example, Patent Document 1 below).

The flow rate of the pulverized fuel to be supplied into the powder delivery pipe is adjusted on the basis of values detected by a plurality of instruments. Examples of such instruments include a load cell (a weighing scale) that measures the weight of the feed tank. The flow rate of the pulverized fuel to be supplied into the powder delivery pipe is adjusted with a load cell as follows. The weight of powder in the feed tank is obtained by performing tare subtraction, span adjustment, and the like on a load received by the load cell from the feed tank, and the supply rate per unit time of the pulverized fuel supplied into the powder delivery pipe is computed from the rate of change in the weight of the powder obtained by differentiating a change in the powder weight. The aperture of the powder discharge valve and the differential pressure between the pressure in the feed tank and the pressure in the powder delivery pipe are then adjusted on the basis of the computation result to adjust the flow rate of the supplied powder.

From the viewpoint of the adjustment of the flow rate of the supplied powder in this manner, it is important to correctly obtain the weight of the powder in the feed tank from a measurement obtained by a load cell.

CITATION LIST

Patent Document

[Patent Document 1] JP-A-06-115690

SUMMARY OF INVENTION

Objects to be Achieved by the Invention

The powder in the feed tank is supplied from the inside of a pressure equalizing tank provided above the feed tank through a pipe. The pipe is provided with a bellows-like expansion/contraction part, which has alternating large and small diameters, at a middle portion thereof. This expansion/contraction part is capable of expanding and contracting slightly in the vertical direction by the force of the feed tank pulling the pipe. When the amount of powder in the feed tank is large and the weight of the entire feed tank is thus heavy, the expansion/contraction part expands, resulting in a lower position of the feed tank. Conversely, when the amount of the powder in the feed tank is small and the weight of the entire feed tank is thus relatively light, the expansion/contraction part expands less, resulting in a relatively upper position of the feed tank. Such a vertical shift of the feed tank by the length of the expansion of the expansion/contraction part allows the load cell to detect the weight of the entire feed tank.

In particular, when the pressure in the feed tank is very high, however, the expansion/contraction part tends to expand because of its inner pressure in addition to the expansion caused by the pulling of the feed tank because the inside of the expansion/contraction part, which is part of the pipe connecting the feed tank to the pressure equalizing tank, has a pressure substantially equal to that in the feed tank. The expansion of the expansion/contraction part due to its inner pressure causes the expansion/contraction part to push the feed tank downward through the pipe. In this case, the load cell detects a heavier weight of the entire feed tank than the actual weight of the feed tank. If the supply rate per unit time of the pulverized fuel supplied into the powder delivery pipe is obtained on the basis of such an output from the load cell, a wrong value may be output. This may affect the adjustment of the aperture of the valve for powder and the differential pressure between the pressure in the feed tank and the pressure in the powder delivery pipe, preventing an accurate control of the flow rate of the powder to be supplied.

It is therefore an object of the present invention to provide a powder supply device and a powder supply method capable of controlling, with improved accuracy, the flow rate of powder to be supplied.

Means for Achieving the Objects

To achieve the aforementioned object, the present inventors have expended diligent efforts, so that the weight of the powder in the feed tank can be obtained with accuracy on the basis of a value output by the load cell. The inventors have subtracted a force with which the expansion/contraction part pushes the feed tank downward when the expansion/contraction part expands due to its inner pressure from a load applied by the feed tank to the load cell and is output by the load cell. The force with which the expansion/contraction part expands due to its own inner pressure is a value proportional to the pressure in the expansion/contraction part, and specifically, it is a value proportional to the product of the area of the aperture of the expansion/contraction part at its lower end and the pressure in the expansion/contraction part. This value has been subtracted from the value output by the load cell. This is because the inventors have thought that the weight of the powder in the feed tank could be obtained accurately in this manner.

The inventors, however, have found that, by simply subtracting the force with which the expansion/contraction part pushes the feed tank, the weight of the powder in the feed tank could not be obtained accurately in some cases in which the pressure in the expansion/contraction part changes with a change in the pressure in the feed tank because there is a delay caused from the pressure change to the expansion of the expansion/contraction part. In other words, the inventors have found that the variation in the output caused by the delay from the pressure change to the expansion of the expansion/contraction part is included in the output from the load cell is a cause for which the weight of the powder in the feed tank cannot be obtained accurately.

Thus, the present inventors have further expended diligent efforts to achieve the present invention.

The present invention provides a powder supply device that supplies powder in a feed tank to outside of the feed tank, the powder supply device including: a powder supply pipe having at least a part being an expansion/contraction part adapted to expand/contract in a vertical direction, connected to an upper portion of the feed tank, and adapted to supply the powder into the feed tank; a first valve provided between the expansion/contraction part and the feed tank; a load cell adapted to receive a load from the feed tank to detect the load; and a controller, wherein the controller obtains a powder weight or a rate of change in the powder weight in the feed tank on the basis of a value obtained by subtracting a value proportional to a pressure in the expansion/contraction part from the load detected by the load cell in a state in which the first valve is closed, and controls a flow rate of powder to be supplied to outside of the feed tank on the basis of the powder weight or the rate of change in the powder weight.

In addition, the present invention provides a powder supply method for supplying powder in a feed tank to outside of the feed tank, the powder supply method including: a supply step of supplying powder into the feed tank through a powder supply pipe having at least a part being an expansion/contraction part adapted to expand/contract in a vertical direction and connected to an upper portion of the feed tank; a first valve closing step of closing a first valve provided between the expansion/contraction part and the feed tank; a calculation step of obtaining a powder weight or a rate of change in the powder weight in the feed tank on the basis of a value obtained by subtracting a value proportional to a pressure in the expansion/contraction part from a load detected by a load cell adapted to receive a load from the feed tank in a state in which the first valve is closed; and a flow rate control step of controlling a flow rate of powder to be supplied to outside of the feed tank on the basis of the powder weight or the rate of change in the powder weight.

In such a powder supply device and a powder supply method, the powder weight or the rate of change in the powder weight in the feed tank is obtained on the basis of a value obtained by subtracting a force of the expansion/contraction part pushing the feed tank by the expansion due to its internal pressure from the load applied by the feed tank to the load cell in a state in which the first valve provided between the expansion/contraction part and the feed tank are tightened. In this manner, it is possible to prevent the pressure in the expansion/contraction part from changing owing to the pressure change in the feed tank even when the pressure in the feed tank changes, which can prevent the variation in the output caused by the pressure change in the expansion/contraction part from being included in the output from the load cell. Since computation is performed on the basis of such an output from the load cell, the powder weight or the rate of change in the powder weight in the feed tank can be obtained accurately. The flow rate of the powder to be supplied to the outside of the feed tank is controlled on the basis of the powder weight or the rate of change in powder weight in the feed tank obtained accurately as described above, and thus the flow rate of the powder to be supplied can be controlled with improved accuracy.

Furthermore, in the powder supply device describe above, the controller preferably obtains the powder weight or the rate of change in the powder weight after the first valve is closed and a change in the pressure in the expansion/contraction part becomes within a predetermined range, and in the powder supply method described above, the calculation step is preferably performed after the first valve is closed and a change in the pressure in the expansion/contraction part becomes within a predetermined range.

The pressure in the expansion/contraction part may change for a while after the first valve is closed owing to a change in the pressure in the expansion/contraction part immediately before closing the first valve or the like. In such a case, the expansion/contraction part may expand/contract with a delay from the pressure change in the expansion/contraction part. Thus, by obtaining the powder weight or the rate of change in the powder weight after the pressure in the expansion/contraction part becomes within the predetermined range as described above, the powder weight or the rate of change in the powder weight in the feed tank can be obtained more accurately, and the flow rate of the supplied powder can be controlled more accurately.

Furthermore, the powder supply device described above preferably further includes a pressure equalizing tank connected to an end of the powder supply pipe opposite to an end on a side of the feed tank; and a second valve provided between the expansion/contraction part and the pressure equalizing tank, wherein the controller preferably obtains the powder weight or the rate of change in the powder weight in a state in which the second valve is closed, and the powder supply method described above preferably further includes a second closing step of closing a second valve provided between a pressure equalizing tank connected to an end of the powder supply pipe opposite to an end thereof on a side of the feed tank and the expansion/contraction part, wherein the calculation step is preferably performed in a state in which the second valve is closed.

Since the first valve and the second valve are both closed and the space in the expansion/contraction part is blocked from the spaces in the feed tank and the pressure equalizing tank, the pressure in the expansion/contraction part is not likely to change. Thus, the powder weight or the rate of change in the powder weight in the feed tank can be obtained more accurately, and the flow rate of the supplied powder can be controlled further more accurately.

Furthermore, in a case in which the powder weight or the rate of change in the powder weight is obtained in a state in which the second valve is closed as described above, the powder supply device described above preferably further includes an internal pressure control valve communicating with the expansion/contraction part, wherein the controller preferably controls the internal pressure control valve so that the pressure in the expansion/contraction part becomes a predetermined set pressure in a state in which the first valve and the second valve are closed, and then obtains the powder weight or the rate of change in the powder weight. Furthermore, the powder supply method described above preferably further includes a pressure control step of controlling an internal pressure control valve communicating with the expansion/contraction part so that the pressure in the expansion/contraction part becomes a predetermined set pressure in a state in which the first valve and the second valve are closed, wherein the calculation step is preferably performed after the pressure control step.

As a result of bringing the pressure in the expansion/contraction part into the set pressure, the force pushing the feed tank 11 lower due to the pressure in the expansion/contraction part can be estimated in advance. Thus, for obtaining the powder weight or the rate of change in the powder weight, the coefficient of proportionality by which the pressure in the expansion/contraction part is multiplied can be determined easily. It is thus possible to easily obtain the powder weight or the rate of change in the powder weight. Furthermore, as a result of bringing the pressure in the expansion/contraction part into the set pressure in the state in which the first valve and the second valve are closed, the amount of expansion of the expansion/contraction part and the force of the expansion/contraction part pushing the feed tank can be estimated to some extent. Thus, if an abnormality occurs in obtaining the powder weight in the feed tank or the rate of change thereof, the abnormality can easily be detected.

Alternatively, the powder supply device described above preferably further includes: a pressure indicator configured to detect the pressure in the expansion/contraction part; and an internal pressure control valve communicating with the expansion/contraction part, wherein the controller preferably controls the internal pressure control valve so that the pressure in the expansion/contraction part changes periodically upward and downward by an equal pressure with respect to a predetermined set pressure in a state in which the first valve and the second valve are closed, obtains the powder weight or the rate of change in the powder weight when the pressure indicator indicates a pressure lower than the set pressure by a certain value, and obtains the powder weight or the rate of change in the powder weight when the pressure indicator indicates a pressure higher than the set pressure by a certain value, and controls the flow rate of the powder to be supplied to outside of the feed tank on the basis of an average of the powder weight when the pressure indicator indicates the pressure lower than the set pressure by the certain value and the powder weight when the pressure indicator indicates the pressure higher than the set pressure by the certain value or an average of the rate of change in the powder weight when the pressure indicator indicates the pressure lower than the set pressure by the certain value and the rate of change in the powder weight when the pressure indicator indicates the pressure higher than the set pressure by the certain value.

Furthermore, the powder supply method described above preferably further includes: a pressure control step of controlling an internal pressure control valve communicating with the expansion/contraction part so that changes periodically upward and downward by an equal pressure with respect to a predetermined set pressure in a state in which the first valve and the second valve are closed, wherein in the calculation step, the powder weight or the rate of change in the powder weight when a pressure indicator configured to detect the pressure in the expansion/contraction part indicates a pressure lower than the set pressure by a certain value is preferably obtained, and the powder weight or the rate of change in the powder weight when the pressure indicator indicates a pressure higher than the set pressure by a certain value is preferably obtained, and in the flow rate control step, the flow rate of the powder to be supplied to outside of the feed tank is preferably controlled on the basis of an average of the powder weight when the pressure indicator indicates the pressure lower than the set pressure by the certain value and the powder weight when the pressure indicator indicates the pressure higher than the set pressure by the certain value or an average of the rate of change in the powder weight when the pressure indicator indicates the pressure lower than the set pressure by the certain value and the rate of change in the powder weight when the pressure indicator indicates the pressure higher than the set pressure by the certain value.

There are limits in the detection by the pressure indicator configured to detect the pressure in the expansion/contraction part. When the pressure in the expansion/contraction part changes within the range of the detection limits, the pressure indicator does not detect the change. Thus, if the pressure in the expansion/contraction part changes within the range of the detection limit of the pressure indicator owing to some reason, the controller assumes the pressure in the expansion/contraction part to be a certain value and subtracts a value proportional to the pressure in the expansion/contraction part from the load received by the load cell, and obtains the powder weight or the rate of change in the powder weight in the feed tank, although the load received by the load cell actually changes owing to a change in the force of the expansion/contraction part pushing the feed tank. In this case, an error due to the pressure change in the expansion/contraction part is contained in the flow rate of the supplied powder.

An error contained when the pressure in the expansion/contraction part is detected to be a pressure higher than the set pressure by a certain value and an error contained when the pressure in the expansion/contraction part is detected to be a pressure lower than the set pressure by a certain value tend to have opposite values. Thus, as a result of averaging the powder weights and the rates of change in the powder weight obtained with the errors, the errors having opposite values to each other are offset by each other, which can prevent the errors from being contained in the obtained average of the powder weights or the rates of change in the powder weight. Consequently, the flow rate of the powder to be supplied can be controlled with improved accuracy.

Furthermore, in the powder supply device described above, the controller preferably obtains the powder weight or the rate of change in the powder weight when the pressure indicator indicates the pressure lower than the set pressure by the certain value while the pressure in the expansion/contraction part either increases or decreases, and obtains the powder weight or the rate of change in the powder weight when the pressure indicator indicates the pressure higher than the set pressure by the certain value while the pressure in the expansion/contraction part either increases or decreases. Furthermore, in the powder supply method described above, in the calculation step, the powder weight or the rate of change in the powder weight when the pressure indicator indicates the pressure lower than the set pressure by the certain value while the pressure in the expansion/contraction part either increases or decreases is preferably obtained, and the powder weight or the rate of change in the powder weight when the pressure indicator indicates the pressure higher than the set pressure by the certain value while the pressure in the expansion/contraction part either increases or decreases is preferably obtained.

As a result of such control, even if an error contained when the pressure in the expansion/contraction part is detected to be a pressure higher than the set pressure by a certain value and an error contained when the pressure in the expansion/contraction part is detected to be a pressure lower than the set pressure by a certain value are not offset by each other, the errors that are not offset by each other are likely to be errors having the same tendency. Thus, it is possible to prevent errors having different tendencies from being contained each time the pressure indicator detects the pressure in the expansion/contraction part, and to obtain the powder weight or the rate of change in the powder weight more stably. It is thus possible to control the flow rate of supplied pulverized fuel more stably.

Alternatively, in the powder supply device described above, the controller preferably obtains the powder weight or the rate of change in the powder weight when the pressure indicator indicates the pressure lower than the set pressure by the certain value while the pressure in the expansion/contraction part either increases or decreases, and obtains the powder weight or the rate of change in the powder weight when the pressure indicator indicates the pressure higher than the set pressure by the certain value while the pressure in the expansion/contraction part either decreases or increases. Furthermore, in the powder supply method described above, in the calculation step, the powder weight or the rate of change in the powder weight when the pressure indicator indicates the pressure lower than the set pressure by the certain value while the pressure in the expansion/contraction part either increases or decreases is preferably obtained, and the powder weight or the rate of change in the powder weight when the pressure indicator indicates the pressure higher than the set pressure by the certain value while the pressure in the expansion/contraction part either decreases or increases is preferably obtained.

As a result of such control, an error contained when the pressure in the expansion/contraction part is detected to be a pressure higher than the set pressure by a certain value and an error contained when the pressure in the expansion/contraction part is detected to be a pressure lower than the set pressure by a certain value tend to further be offset by each other in an average of the powder weights or the rates of change in the powder weight. Thus, as a result of the control as described above, it is possible to further prevent an error from being contained in the powder weight or the rate of change in the powder weight obtained by averaging, and it is possible to control the flow rate of the supplied powder further more accurately.

Alternatively, for obtaining the powder weight or the rate of change in the powder weight in the state in which the second valve is closed as described above, the powder supply device described above preferably further includes: a pressure indicator configured to detect the pressure in the expansion/contraction part; and an internal pressure control valve communicating with the expansion/contraction part, wherein the controller preferably controls the internal pressure control valve so that the pressure in the expansion/contraction part changes periodically upward and downward by an equal pressure with respect to a predetermined set pressure in a state in which the first valve and the second valve are closed, and obtains the powder weight or the rate of change in the powder weight when the pressure indicator indicates the set pressure. Furthermore, the powder supply method described above preferably further includes: a pressure control step of controlling an internal pressure control valve communicating with the expansion/contraction part so that the pressure in the expansion/contraction part changes periodically upward and downward by an equal pressure with respect to a predetermined set pressure in a state in which the first valve and the second valve are closed, wherein in the calculation step, the powder weight or the rate of change in the powder weight when a pressure indicator configured to detect the pressure in the expansion/contraction part indicates the set pressure is preferably obtained.

The present inventors have found that, even if the pressure indicator detects the pressure in the expansion/contraction part containing errors, the pressure indicator can detect the pressure in the expansion/contraction part with smaller errors when the pressure in the expansion/contraction part changes than when the pressure in the expansion/contraction part does not change in general. Moreover, since the pressure in the expansion/contraction part changes periodically upward and downward by an equal pressure with respect to the set pressure, an average force of the expansion/contraction part pushing the feed tank can be assumed to be the force of the expansion/contraction part pushing the feed tank when the pressure in the expansion/contraction part is the set pressure. With the control as described above, it is thus possible to obtain the powder weight or the rate of change in the powder weight in the feed tank more accurately, and to control the flow rate of the supplied powder more accurately.

Furthermore, in the powder supply device described above, the controller preferably obtains the powder weight or the rate of change in the powder weight when the pressure indicator indicates the set pressure while the pressure in the expansion/contraction part either increases or decreases, and in the powder supply method described above, in the calculation step, the powder weight or the rate of change in the powder weight when the pressure indicator indicates the set pressure while the pressure in the expansion/contraction part either increases or decreases is preferably obtained.

As a result of such control, even if the pressure indicator detects the pressure in the expansion/contraction part with an error contained in each detection, the errors are likely to have the same tendency. Thus, it is possible to prevent errors having different tendencies from being contained each time the pressure indicator detects the pressure in the expansion/contraction part, and to obtain the powder weight or the rate of change in the powder weight more stably. It is thus possible to control the flow rate of supplied pulverized fuel more stably.

Alternatively, in the powder supply device described above, the controller preferably alternately obtains the powder weight or the rate of change in the powder weight when the pressure indicator indicates the set pressure while the pressure in the expansion/contraction part increases and obtains the powder weight or the rate of change in the powder weight when the pressure indicator indicates the set pressure while the pressure in the expansion/contraction part decreases. Furthermore, in the powder supply method described above, in the calculation step, obtaining the powder weight or the rate of change in the powder weight when the pressure indicator indicates the set pressure while the pressure in the expansion/contraction part increases and obtaining the powder weight or the rate of change in the powder weight when the pressure indicator indicates the set pressure while the pressure in the expansion/contraction part decreases are preferably performed alternately.

Even if the pressure indicator detects the pressure in the expansion/contraction part containing errors, an error contained when the set pressure is detected while the pressure in the expansion/contraction part increases and an error contained when the set pressure is detected while the pressure in the expansion/contraction part decreases tend to have opposite values. Thus, as a result of the control as described above, an error having a certain tendency and an error having a tendency opposite thereto are alternately contained each time the pressure indicator detects the pressure in the expansion/contraction part. Thus, the flow rate of the powder controlled on the basis of the powder weight or the rate of change in the powder weight obtained while the pressure in the expansion/contraction part increases and the flow rate of the powder controlled on the basis of the powder weight or the rate of change in the powder weight obtained while the pressure in the expansion/contraction part decreases can offset errors by each other, and the flow rate of the supplied powder can be controlled more accurately.

Furthermore, in the powder supply device described above, when the first valve is opened, the pressure in the expansion/contraction part and the pressure in the feed tank are preferably made equal, and the powder supply method described above further includes a first opening step of opening the first valve, the first opening step is performed after the pressure in the expansion/contraction part and the pressure in the feed tank are preferably made equal after the second closing step.

When the first valve is opened, the pressure in the expansion/contraction part can be prevented from changing immediately after the first valve is opened by making the pressure in the expansion/contraction part and in the feed tank equal. Thus, in cases where the first valve is closed immediately after the first valve is opened or where the first valve is closed before the pressure in the feed tank changes, it is possible to prevent the calculation of the powder weight or the rate of change in the powder weight in the feed tank from being inaccurate, and prevent the flow rate of the supplied powder from being inaccurate.

Furthermore, in the powder supply device described above, after the pressure in the pressure equalizing tank and the pressure in the feed tank are made equal and the first valve is opened, the second valve is preferably opened, and the powder supply method preferably further includes: a first opening step of opening the first valve; and a second opening step of opening the second valve, wherein the second opening step is preferably performed after the pressure in the pressure equalizing tank and the pressure in the feed tank are made equal and after the first opening step.

In general, the pressure equalizing tank and the feed tank have much larger volumes than the powder supply pipe. Thus, if the first valve is opened and the pressure in the expansion/contraction part slightly changes, the change in the pressure in the expansion/contraction part is absorbed by the pressure equalizing tank having a pressure equal to that of the feed tank as a result of opening the second valve. It is thus possible to reduce the change in the pressure in the expansion/contraction part. Furthermore, since no pressure change occurs in the feed tank due to the pressure difference between the pressure in the pressure equalizing tank and the pressure in the feed tank, the pressure in the expansion/contraction part is less likely to change. Thus, the flow rate of the powder in the feed tank can be accurately obtained in a case where the first valve is closed immediately after supplying of powder from the pressure equalizing tank into the feed tank is finished or in a case where the first valve is closed before the pressure in the feed tank changes.

Effect of Invention

As described above, the present invention provides a powder supply device and a powder supply method capable of controlling, with improved accuracy, the flow rate of powder to be supplied.

DESCRIPTION OF EMBODIMENTS

A preferred embodiment of a powder supply device and a powder supply method according to the present invention will be described in detail below with reference to the drawings.

<<Structure of Powder Supply Device 1>>

Figure 1:
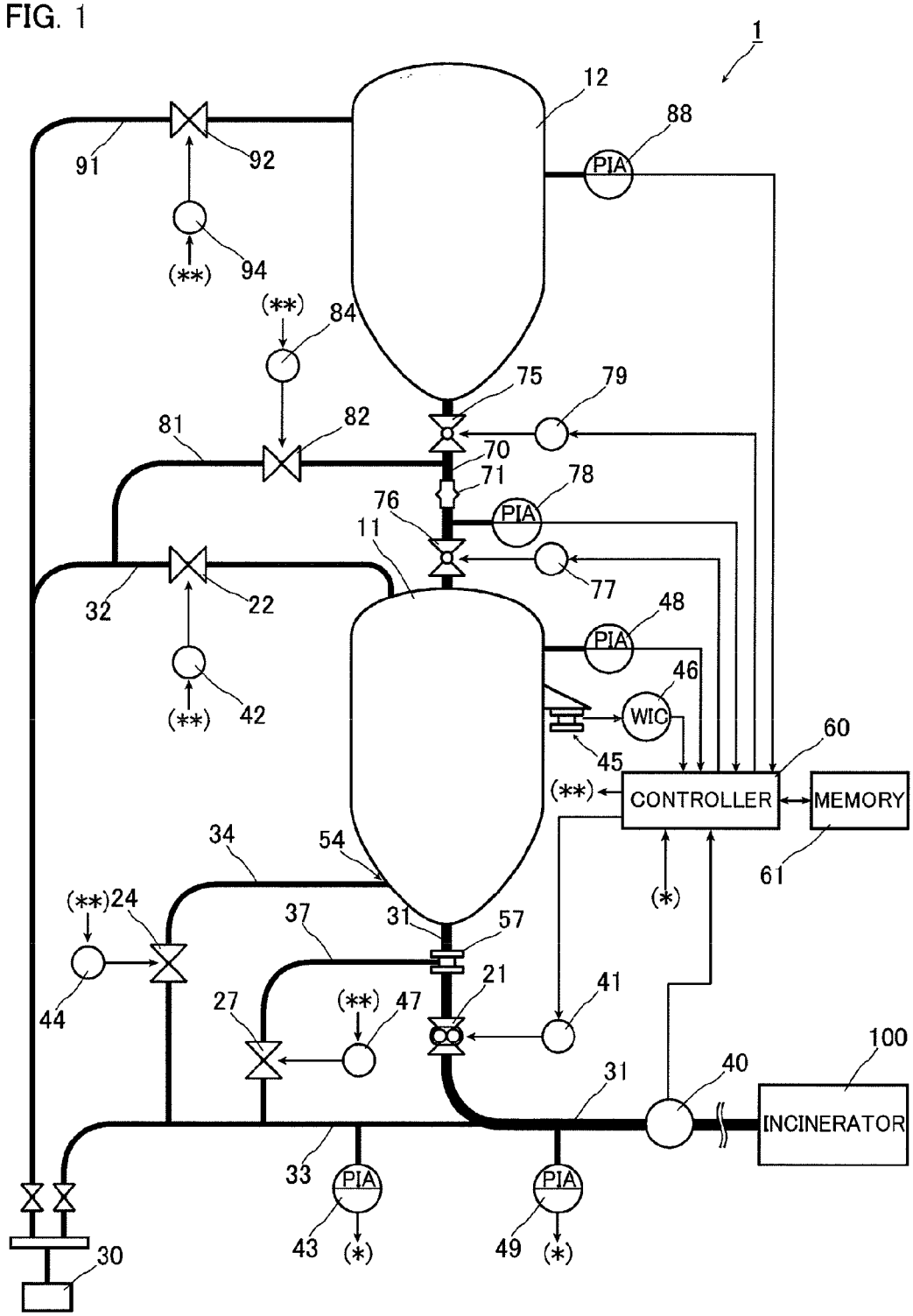
FIG. 1 is a diagram showing a powder supply device according to an embodiment of the present invention.

FIG. 1 is a diagram showing the powder supply device according to the embodiment of the present invention.

As illustrated in FIG. 1, a powder supply device 1 includes, as main components, a feed tank 11 for supplying a predetermined amount of pulverized fuel such as pulverized coal, a pressure equalizing tank 12 in which the pulverized fuel to be supplied to the feed tank 11 is stored, a powder supply pipe 70 for supplying the powder in the pressure equalizing tank 12 to the feed tank 11, an internal pressure gas supply pipe 32 connected to the feed tank 11 and adapted to convey gas for internal pressure to be supplied into the feed tank 11, a powder delivery pipe 31 connected to the feed tank 11 and adapted to convey the pulverized fuel supplied from the feed tank 11, a powder discharge valve 21 connected to the powder delivery pipe 31 and adapted to adjust the flow rate of the pulverized fuel supplied from the feed tank 11, and a carrier gas main pipe 33 connected to the powder delivery pipe 31 and adapted to introduce carrier gas into the powder delivery pipe 31.

The feed tank 11 and the pressure equalizing tank 12 are metallic tanks. The feed tank 11 is positioned below the pressure equalizing tank 12, with the powder supply pipe 70 connected at one end thereof to a bottom portion of the pressure equalizing tank 12 and at another end thereof to a top portion of the feed tank 11. Furthermore, the powder supply pipe 70 is provided with a powder supply valve 75 that is a second valve in a middle portion thereof, and supplying of the pulverized fuel from the pressure equalizing tank 12 to the feed tank 11 is controlled by opening and closing of the powder supply valve 75. In addition, a powder supply valve indicator 79 is connected to the powder supply valve 75 and is adapted to open and close the powder supply valve 75.

Furthermore, an expansion/contraction part 71 that expands and contracts in the vertical direction is provided below the powder supply valve 75 in the powder supply pipe 70. The powder supply valve 75 is thus provided between the expansion/contraction part 71 and the pressure equalizing tank 12.

Figures 2, 3:
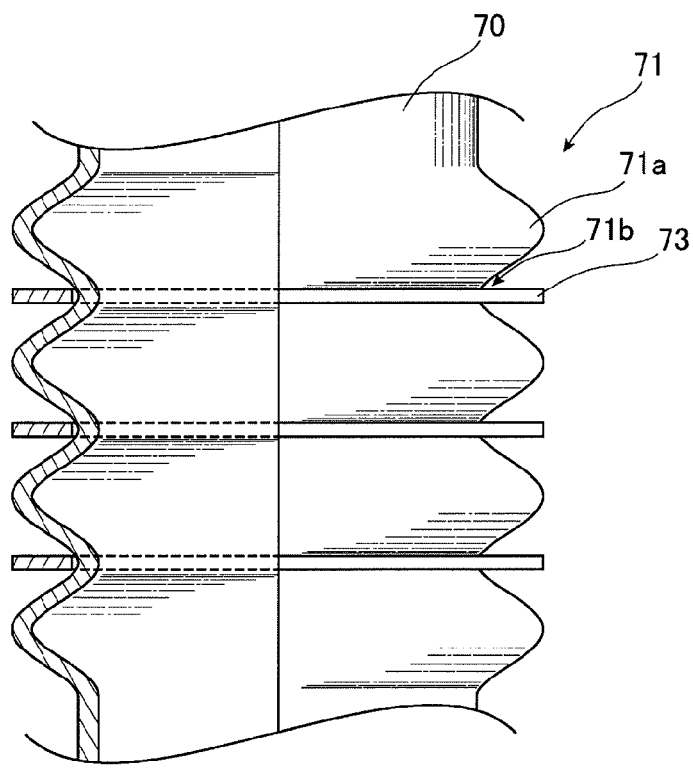
FIG. 2 is a partial view of a powder supply pipe.
FIG. 3 is a partial schematic example of information in a memory.
Figure 4:
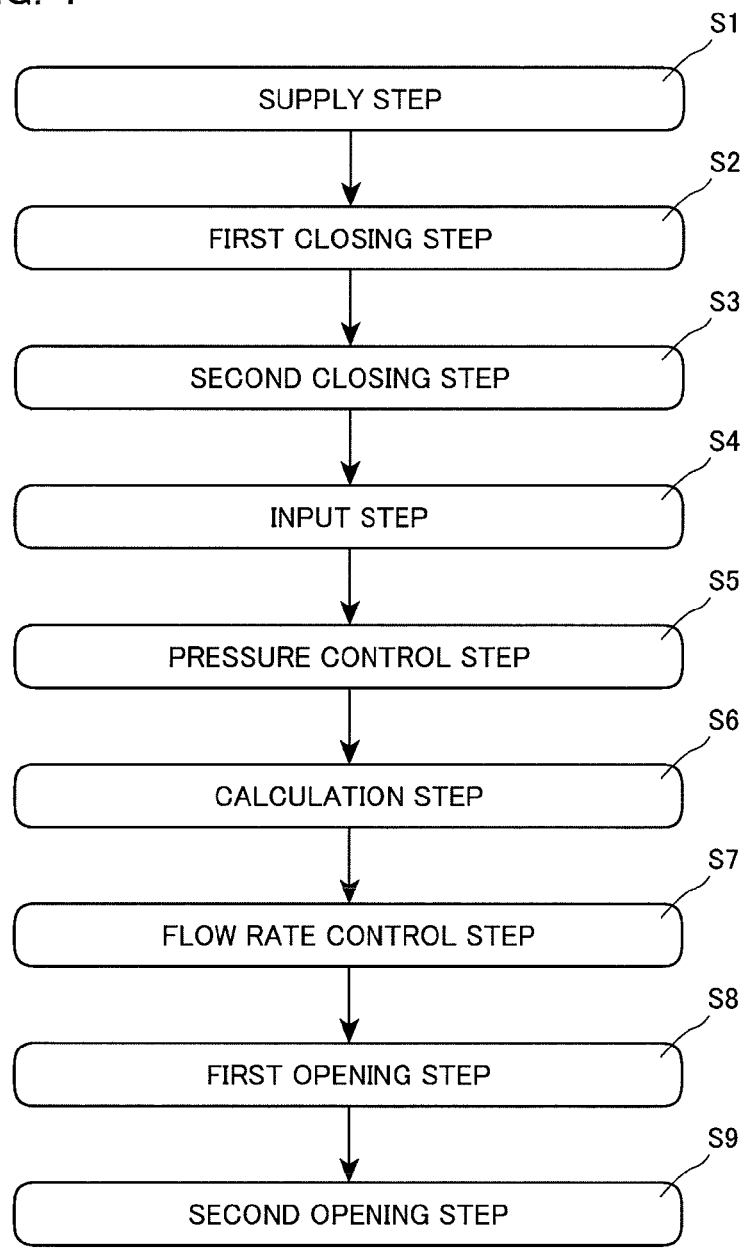
FIG. 4 is a flowchart of an operation of the powder supply device.

FIG. 2 is a partial view of the powder supply pipe 70, in which a structure of the expansion/contraction part 71 is illustrated in particular. The right half of FIG. 2 is an external view of the expansion/contraction part 71, and the left half is a sectional view of a cross-sectional structure of the expansion/contraction part 71. As illustrated in FIG. 2, the expansion/contraction part 71 has alternating large diameter portions 71a having large diameters and small diameter portions 71b having small diameters, so that the powder supply pipe 70 has a bellows-like external shape. With such a structure, the expansion/contraction part 71 can expand and contract in the longitudinal direction of the powder supply pipe 70. Since the powder supply pipe 70 is placed with its longitudinal direction along the vertical direction, the expansion/contraction part expands and contracts in the vertical direction as described above.

Metallic rings 73 are provided on the outer circumferential surfaces of the small diameter portions 71b. These rings 73 preclude excessive growth in diameter of the small diameter portions 71b, thereby preventing the expansion/contraction part 71 from bulging radially.

Furthermore, as illustrated in FIG. 1, a closing valve 76 that is a first valve is provided between the expansion/contraction part 71 and the feed tank 11. The closing valve 76 cooperates with the powder supply valve 75 to make the pressure in the expansion/contraction part independent of the pressure change in the pressure equalizing tank and the pressure change in the feed tank and control the pressure constant. The closing valve 76 and the powder supply valve 75 preferably have linear flow passages when open and no projections or the like that blocks the flow of the pulverized fuel in the flow passages like a ball valve and a gate valve. When the closing valve 76 is open, the space in the expansion/contraction part 71 and the space in the feed tank 11 are connected to each other with the closing valve 76 therebetween. When the closing valve 76 is closed, the space in the expansion/contraction part 71 and the space in the feed tank 11 are separated from each other.

Furthermore, a pressure indicator 78 is connected between the expansion/contraction part 71 and the closing valve 76 of the powder supply pipe 70 to detect the pressure in the expansion/contraction part 71 and output a signal containing information based on the pressure in the expansion/contraction part 71. Moreover, a closing valve indicator 77 is connected to the closing valve 76. The closing valve indicator 77 is capable of opening and closing the closing valve 76.

A load cell 45 is connected to the feed tank 11, to continuously detect a load applied by the feed tank 11 to the load cell 45. In other words, with a high flow rate of the pulverized fuel in the feed tank 11, the entire weight of the feed tank 11 increases, making the expansion/contraction part 71 of the powder supply pipe 70 expand to shift the feed tank 11 to a lower position. This enables the load cell 45 to detect the load applied by the feed tank 11. A weight indicator/controller (WIC) 46 is connected to the load cell 45 to output signals including a detection signal output by the load cell 45.

Furthermore, a pressure indicator 48 is connected to the feed tank 11 and a pressure indicator 88 is connected to the pressure equalizing tank 12. The pressure indicators 48 and 88 detect the pressure in the feed tank 11 and the pressure in the pressure equalizing tank 12, respectively, and output a signal containing information based on the pressure in the feed tank 11 and a signal containing information based on the pressure in the pressure equalizing tank 12, respectively.

In addition, the powder delivery pipe 31 is connected to a bottom portion of the feed tank 11. The pulverized fuel supplied from the feed tank 11 is introduced into the powder delivery pipe 31 from the feed tank 11 and conveyed by the powder delivery pipe 31 as described above.

The powder discharge valve 21 is connected to a middle portion of the powder delivery pipe 31 as described above. The pulverized fuel supplied from the feed tank 11 is thus conveyed by the powder delivery pipe 31 via the powder discharge valve 21.

The powder discharge valve 21 is a ball valve made of a sphere in which a throughhole having a predetermined inner diameter is formed, a rotatable control valve made of a set of cylinders each having a notch in a side face thereof, the cylinders being arranged in a manner that the side faces are in contact with each other, or the like. The flow rate of the pulverized fuel supplied from the feed tank 11 can be adjusted by adjusting the aperture of the powder discharge valve 21. Since the powder discharge valve 21 is a valve through which the pulverized fuel passes, the powder discharge valve 21 can directly control the flow rate of the pulverized fuel. It is thus possible to change the powder flow rate greatly within a short time by adjusting the aperture of the powder discharge valve. Furthermore, a powder discharge valve indicator 41 is connected to the powder discharge valve 21 and is capable of adjusting the aperture of the powder discharge valve 21.

As described above, the internal pressure gas supply pipe 32 to supply internal pressure gas for adjusting the pressure in the feed tank 11 is connected to the feed tank 11, and the internal pressure control valve 22 is provided in the internal pressure gas supply pipe 32. The amount of internal pressure gas supplied to the feed tank 11 is adjusted by adjusting the aperture of the internal pressure control valve 22. Furthermore, an internal pressure control valve indicator 42 is connected to the internal pressure control valve 22, and is capable of adjusting the aperture of the internal pressure control valve 22. The internal pressure control valve 22 preferably has a function of an exhaust valve that releases gas in the feed tank 11 to the outside. Alternatively, the feed tank 11 may be provided with an undepicted exhaust pipe, which may include an exhaust valve that is a second internal pressure control valve to be capable of releasing unwanted gas in the feed tank 11 to the outside.

A gas generator 30 is connected to one end of the internal pressure gas supply pipe 32 opposite to the end thereof on the side of the feed tank 11. Part of gas output from the gas generator 30 is introduced into the internal pressure gas supply pipe 32 and used as internal pressure gas.

An internal pressure gas supply pipe 91 to supply internal pressure gas into the pressure equalizing tank 12 is branched off from the internal pressure gas supply pipe 32 and is connected to the pressure equalizing tank 12. The internal pressure gas supply pipe 91 is provided with an internal pressure control valve 92 at a middle portion thereof to control the internal pressure of the pressure equalizing tank 12. The amount of internal pressure gas supplied to the pressure equalizing tank 12 is adjusted by adjusting the aperture of the internal pressure control valve 92. Furthermore, an internal pressure control valve indicator 94 capable of adjusting the aperture of the internal pressure control valve 92 is connected to the internal pressure control valve 92. The internal pressure control valve 92 preferably has a function of an exhaust valve that releases gas in the pressure equalizing tank 12 to the outside. Alternatively, the pressure equalizing tank 12 may be provided with an undepicted exhaust pipe, which may include an exhaust valve that is a second internal pressure control valve to be capable of releasing unwanted gas in the pressure equalizing tank 12 to the outside.

An internal pressure gas supply pipe 81 to supply internal pressure gas into the powder supply pipe 70 is also branched off from the internal pressure gas supply pipe 32 and is connected between the powder supply valve 75 and the closing valve 76 of the powder supply pipe 70. The internal pressure gas supply pipe 81 is provided with an internal pressure control valve 82 at a middle portion thereof. The internal pressure control valve 82 communicates with the expansion/contraction part. Adjustment of the internal pressure control valve 82 allows the amount of the internal pressure gas supplied into the powder supply pipe 70 to be controlled and the internal pressure of the powder supply pipe 70 to be thus controlled. Furthermore, an internal pressure control valve indicator 84 capable of adjusting the aperture of the internal pressure control valve 82 is connected to the internal pressure control valve 82. The internal pressure control valve 82 preferably has a function of an exhaust valve that releases gas in the powder supply pipe 70 to the outside. Alternatively, the powder supply pipe 70 may be provided with an undepicted exhaust pipe, which may include an exhaust valve that is a second internal pressure control valve to be capable of releasing unwanted gas in the powder supply pipe 70 to the outside.

The carrier gas main pipe 33 is also connected to the gas generator 30. The carrier gas main pipe 33 is a pipe for introducing carrier gas for conveying the pulverized fuel into the powder delivery pipe 31. Thus, an end of the carrier gas main pipe 33 opposite to that on the side of the gas generator 30 is connected to the powder delivery pipe 31 described above at a position opposite to the feed tank 11 with respect to the powder discharge valve 21. The pulverized fuel introduced into the powder delivery pipe 31 from the feed tank 11 via the powder discharge valve 21 is conveyed by the carrier gas introduced into the powder delivery pipe 31 from the carrier gas main pipe 33. Furthermore, a pressure indicator 43 is connected to the carrier gas main pipe 33 to detect the pressure in the carrier gas main pipe 33 and output a signal based on the pressure in the carrier gas main pipe 33.

As described above, part of the gas output from the gas generator 30 is introduced into the internal pressure gas supply pipe 32, and another part of the gas output from the gas generator 30 is introduced into the carrier gas main pipe 33. Thus, the internal pressure gas and the carrier gas are the same gas species in the present embodiment.

Furthermore, the fluidizing gas pipe 34 is branched off from the carrier gas main pipe 33, and an end of the fluidizing gas pipe 34 opposite to that on the side of the branch point at the carrier gas main pipe 33 is connected to the bottom portion of the feed tank 11. In the present embodiment, the portion where the fluidizing gas pipe 34 is connected to the feed tank 11 is a powder fluidizing portion 54. Part of the carrier gas flowing through the carrier gas main pipe 33 is introduced as fluidizing gas into the fluidizing gas pipe 34, and the fluidizing gas is introduced into the feed tank 11 from below via the powder fluidizing portion 54. Since part of the carrier gas is used as the fluidizing gas as described above, the fluidizing gas and the carrier gas are the same gas species in the present embodiment. Furthermore, the fluidizing gas pipe 34 is provided with the fluidizing gas valve 24 in the middle portion thereof. The amount of the fluidizing gas introduced into the feed tank 11 is adjusted by adjusting the aperture of the fluidizing gas valve 24. Furthermore, a fluidizing gas valve indicator 44 is connected to the fluidizing gas valve 24, and is adapted to adjust the aperture of the fluidizing gas valve 24.

In addition, a refluidizing gas pipe 37 is branched off from the carrier gas main pipe 33 at a position different from the position from which the fluidizing gas pipe 34 is branched off, and an end of the refluidizing gas pipe 37 opposite to that on the side of the branch point at the carrier gas main pipe 33 is connected to a portion of the powder delivery pipe 31 between the powder discharge valve 21 and the powder fluidizing portion 54. In the present embodiment, the portion where the refluidizing gas pipe 37 is connected between the powder discharge valve 21 and the powder fluidizing portion 54 is the powder refluidizing portion 57, from which the refluidizing gas is introduced into the powder delivery pipe 31. Although the powder refluidizing portion 57 and the powder discharge valve 21 are connected by the powder delivery pipe 31 in FIG. 1, the powder refluidizing portion 57 is preferably connected directly to the powder discharge valve 21. In this manner, part of the carrier gas flowing through the carrier gas main pipe 33 is introduced as the refluidizing gas into the refluidizing gas pipe 37, and the refluidizing gas is introduced between the powder discharge valve 21 and the powder fluidizing portion 54 via the powder refluidizing portion 57. As described above, the refluidizing gas pipe 37 is branched off from the carrier gas main pipe 33, and the refluidizing gas and the carrier gas are the same gas species in the present embodiment. Thus, all of the fluidizing gas, the refluidizing gas, and the carrier gas are the same gas species. Furthermore, the refluidizing gas valve 27 is provided in a middle portion of the refluidizing gas pipe 37, and the amount of the introduced refluidizing gas is adjusted by adjusting the aperture of the refluidizing gas valve 27. Furthermore, a refluidizing gas valve indicator 47 is connected to the refluidizing gas valve 27, and is adapted to adjust the aperture of the refluidizing gas valve 27.

In addition, a pressure indicator 49 is connected to a portion of the powder delivery pipe 31 where the pulverized fuel is conveyed by the carrier gas, that is, a portion downstream of the position at the powder delivery pipe 31 to which the carrier gas main pipe 33 is connected, and is configured to detect the pressure in the powder delivery pipe 31 and output a signal containing information based on the pressure in the powder delivery pipe 31. A powder flowmeter 40 is further provided in the portion of the powder delivery pipe 31 where the pulverized fuel is conveyed by the carrier gas, and is adapted to detect the flow rate of powder flowing through the powder delivery pipe 31 and output a signal containing the detected information.

In such a powder supply device 1, the pressure in the feed tank 11 is higher than the pressure in the carrier gas main pipe 33, and the pressure in the carrier gas main pipe 33 is higher than the pressure in the powder delivery pipe 31. The powder supply device 1 is adapted to convey the pulverized fuel by utilizing the differential pressures between these pressures. These pressures are not particularly limited, but may be in a range of 2 MPa to 4 MPa, for example.

The differential pressure between the pressure in the feed tank 11 and the pressure in the carrier gas main pipe 33, the differential pressure between the pressure in the carrier gas main pipe 33 and the pressure in the powder delivery pipe 31, and the differential pressure between the pressure in the feed tank 11 and the pressure in the powder delivery pipe 31 can thus be adjusted by adjusting the pressure in the feed tank 11. Since the powder supply device 1 conveys the pulverized fuel by utilizing the differential pressures as described above, the flow rate of the pulverized fuel supplied from the feed tank 11 can be also adjusted by the differential pressures in addition to the aperture of the powder discharge valve 21 described above. In other words, the differential pressures can be adjusted by adjusting the pressure in the feed tank 11 with the aperture of the internal pressure control valve 22, and the flow rate of the pulverized fuel supplied from the feed tank 11 can thus be adjusted. For adjusting the flow rate of the pulverized fuel, the powder flow rate can be finely adjusted by controlling the differential pressures in this manner.

The powder supply device 1 further includes a controller 60 connected to a memory 61. The controller 60 is connected to the powder flowmeter 40, the pressure indicators 43, 48, 49, 78, and 88 and the weight indicator/controller 46, and receives as input a signal containing information on the powder flow rate output from the powder flowmeter 40, a signal containing information on the pressure in the carrier gas main pipe 33 output from the pressure indicator 43, a signal containing information on the pressure in the feed tank 11 output from the pressure indicator 48, a signal containing information on the pressure in the powder delivery pipe 31 output from the pressure indicator 49, a signal containing information on the pressure in the powder supply pipe 70 output from the pressure indicator 78, a signal containing information on the pressure in the pressure equalizing tank 12 output from the pressure indicator 88, a signal containing information on the load applied to the load cell 45 by the feed tank 11 output from the weight indicator/controller 46, and the like.

The controller 60 then generates control signals on the basis of the signal output from the weight indicator/controller 46 and the signal output from the pressure indicator 78 and also, as necessary, on the basis of the signals from the pressure indicators 43, 48, 49, and 88, information in the memory 61, and the signal from the powder flowmeter 40. The controller 60 is also connected to the powder discharge valve indicator 41, the internal pressure control valve indicators 42, 84, and 94, the fluidizing gas valve indicator 44, the refluidizing gas valve indicator 47, the powder supply valve indicator 79, and the closing valve indicator 77, and is configured to input the generated control signals to the powder discharge valve indicator 41, the internal pressure control valve indicators 42, 84, and 94, the fluidizing gas valve indicator 44, the refluidizing gas valve indicator 47, the powder supply valve indicator 79, and the closing valve indicator 77.

The powder discharge valve indicator 41 is configured to adjust the aperture of the powder discharge valve 21 on the basis of a control signal from the controller 60. Furthermore, the internal pressure control valve indicators 42, 84, and 94 are configured to adjust the apertures of the internal pressure control valves 22, 82, and 92 on the basis of control signals from the controller 60. Furthermore, the fluidizing gas valve indicator 44 is configured to adjust the aperture of the fluidizing gas valve 24 on the basis of a control signal from the controller 60. Furthermore, the refluidizing gas valve indicator 47 is configured to adjust the aperture of the refluidizing gas valve 27 on the basis of a control signal from the controller 60. The powder supply valve indicator 79 is configured to adjust opening and closing of the powder supply valve 75 on the basis of a control signal from the controller 60, and the closing valve indicator 77 is configured to adjust opening and closing of the closing valve 76 on the basis of a control signal from the controller 60.

FIG. 3 is a partial schematic example of the information in the memory 61. In this example, a schematic table is provided to indicate the relationship of the powder flow rate, the aperture of the powder discharge valve 21, and the differential pressure between the pressure in the carrier gas main pipe 33 and the pressure in the powder delivery pipe 31. As illustrated in FIG. 2, when the powder flow rate [l/h] is determined, its relationship with the aperture [%] of the powder discharge valve 21 and the differential pressure [MPa] is specified. For example, when the powder flow rate is 0.5 [l/h], the aperture of the powder discharge valve 21 is 60 [%], and the differential pressure is 0.03 [MPa]. A control signal for adjusting the aperture of the powder discharge valve 21 is then generated by the controller 60 on the basis of the information indicating the aperture of the powder discharge valve 21 from the memory 61, and input to the powder discharge valve indicator 41. Once the differential pressure between the pressure in the carrier gas main pipe 33 and the pressure in the powder delivery pipe 31 is determined, a control signal for adjusting the aperture of the internal pressure control valve 22 is generated by the controller 60 on the basis of the information from the pressure indicators 43 and 49 and information indicating the differential pressure from the memory 61, and this control signal is input to the internal pressure control valve indicator 42. Note that such a table in the memory 61 is obtained in advance through experiments or the like and recorded in the memory 61. Although the differential pressure between the pressure in the carrier gas main pipe 33 and the pressure in the powder delivery pipe 31 is used in this example, the differential pressure between the pressure in the feed tank 11 and the pressure in the carrier gas main pipe 33 or the differential pressure between the pressure in the feed tank 11 and the pressure in the powder delivery pipe 31 may be recorded in the memory 61 for use in the generation of the control signal.

In the powder supply device 1, the powder delivery pipe 31 is directly or indirectly connected to a combustion furnace 100 for burning the pulverized fuel to extract energy.

<<Operation of Powder Supply Device 1>>

Next, operation of the powder supply device 1 will be described.

FIG. 3 is a flowchart of operation of the powder supply device 1.

As illustrated in FIG. 3, operation of the powder supply device 1 includes a supply step S1 of supplying the powder from the powder supply pipe 70 into the feed tank 11, a first closing step S2 of closing the closing valve 76, a second closing step S3 of closing the powder supply valve 75, an input step S4 of inputting information of a desired powder flow rate, a pressure control step S5 of controlling the pressure in the expansion/contraction part 71, a calculation step S6 of receiving signals or the like from the weight indicator/controller 46 and the pressure indicator 78 by the controller 60 and obtaining a rate of change in powder weight in the feed tank 11, a flow rate control step S7 of controlling the flow rate of the pulverized fuel to be supplied to the outside of the feed tank 11 on the basis of the rate of change in powder weight in the feed tank 11, a first opening step S8 of opening the closing valve, and a second opening step S9 of opening the powder supply valve.

(First Operation of Powder Supply Device 1)

First, first operation of the operation of the powder supply device 1 will be described.

<Supply Step S1>

First, at a starting stage of the powder supply device 1, the powder supply valve 75 and the closing valve 76 are opened to supply the pulverized fuel stored in the pressure equalizing tank 12 through the powder supply pipe 70 to the feed tank 11. At a point when the amount of the pulverized fuel in the feed tank 11 reaches a predetermined amount, the powder supply valve 75 is closed to stop supply of the pulverized fuel from the pressure equalizing tank 12 to the feed tank 11.

The fluidizing gas valve 24 is then opened to introduce the fluidizing gas from the fluidizing gas pipe 34 via the powder fluidizing portion 54 into the feed tank 11 for fluidizing the pulverized fuel in the feed tank 11 so that the pulverized fuel is supplied from the feed tank 11 to the powder delivery pipe 31 via the powder discharge valve 21. This facilitates supplying the pulverized fuel from the feed tank 11.

<First Closing Step S2>

Subsequently, a control signal indicating to close the closing valve 76 is sent from the controller 60 to the closing valve indicator 77, and the closing valve indicator 77 closes the closing valve 76 on the basis of the control signal from the controller 60. When the closing valve 76 is closed, the space in the feed tank 11 and the space in the powder supply pipe 70 including the expansion/contraction part 71 are separated from each other by the closing valve 76. Separation between the space in the feed tank 11 and the space in the expansion/contraction part 71 in this manner prevents flow of gas to/from the feed tank 11 from/to the expansion/contraction part 71. Thus, after the closing valve 76 is closed, the pressure in the powder supply pipe 70 (in the expansion/contraction part 71) does not change even when the pressure in the feed tank 11 changes. In the present step, after the closing valve 76 is closed, the powder is not supplied to the feed tank 11 even when the powder supply valve 75 is open.

<Second Closing Step S3>

Subsequently, when the powder supply valve 75 is open, a control signal indicating to close the powder supply valve 75 is sent from the controller 60 to the powder supply valve indicator 79, and the powder supply valve indicator 79 closes the powder supply valve 75 on the basis of the control signal from the controller 60. When the powder supply valve 75 is closed, the space in the pressure equalizing tank 12 and the space in the powder supply pipe 70 including the expansion/contraction part 71 are separated from each other by the powder supply valve 75, preventing flow of gas to/from the powder supply pipe 70 from/to the pressure equalizing tank 12. Since the space in the feed tank 11 and the space in the powder supply pipe 70 are already separated from each other, the pressure in the expansion/contraction part 71 changes little after the powder supply valve 75 is closed unless the internal pressure gas is supplied through the internal pressure gas supply pipe 81 or unless the internal pressure gas is adjusted by the internal pressure control valve 82. If the powder supply valve 75 is closed as described above after the pulverized fuel is supplied through the powder supply pipe 70 to the feed tank 11 and the powder supply valve 75 is not opened thereafter in the supply step S1, nothing in particular is performed in this step. In this case, this step can be regarded as being performed after the powder supply step S1. In other words, the order in which the first closing step S2 and this step are performed may be reversed.

<Input Step S4>

Information on a set value SV of the powder flow rate is then input by an operator through input means. Note that the input means is not shown in FIG. 1. The input information is then input into the controller 60.

<Pressure Control Step S5>

The controller sends a control signal to the internal pressure control valve indicator 84 to control the internal pressure control valve 82 in the state in which the closing valve 76 and the powder supply valve 75 are closed, so that the pressure in the expansion/contraction part 71 becomes a set pressure. The set pressure is a constant pressure stored in the memory 61, which is, for example, 2.650 MPa.

Upon receipt of the information from the input means and the pressure in the expansion/contraction part 71 is set to the set pressure, the controller 60 references the memory 61 to read out an aperture of the powder discharge valve 21 and a differential pressure between the pressure in the carrier gas main pipe 33 and the pressure in the powder delivery pipe 31 associated with the information on a set value SV of the input powder flow rate. The controller 60 then generates a control signal on the initial aperture of the powder discharge valve 21 and sends the control signal to the powder discharge valve indicator 41. The powder discharge valve indicator 41 in receipt of the control signal adjusts the aperture of the powder discharge valve 21 on the basis of the control signal from the controller 60. In this manner, the initial aperture of the powder discharge valve 21 is adjusted on the basis of the information from the memory 61. Note that the fluidizing of the pulverized fuel by the fluidizing gas described above may be started after the input of the information to the input means as long as the fluidizing is done before the powder discharge valve 21 is opened.

With the aperture of the powder discharge valve 21 adjusted, the refluidizing gas is introduced. If the amount of the introduced refluidizing gas is determined on the basis of the aperture of the powder discharge valve 21, the aperture of the refluidizing gas valve 27 is made smaller and the amount of the introduced refluidizing gas is made smaller according to the control signal from the controller 60 as the aperture of the powder discharge valve 21 is larger. In other words, the amount of the introduced refluidizing gas is controlled in inverse proportion to the aperture of the powder discharge valve 21 in this case. This is due to the following reason. Obstruction by the pulverized fuel is likely to occur when the aperture of the powder discharge valve 21 is small whereas obstruction by the pulverized fuel is less likely to occur when the aperture of the powder discharge valve 21 is large. Accordingly, in a state in which the aperture of the powder discharge valve 21 is small where obstruction by the pulverized fuel is likely to occur, the amount of the introduced refluidizing gas is increased, whereas in a state in which the aperture of the powder discharge valve 21 is large where the obstruction by the pulverized fuel is less likely to occur, the amount of the introduced refluidizing gas is decreased. In this manner, it is possible to prevent an unnecessarily large amount of refluidizing gas from being introduced by determining the amount of the introduced refluidizing gas on the basis of the aperture of the powder discharge valve.

As described above, the powder refluidizing portion 57 is provided at a portion of the powder delivery pipe 31 between the powder fluidizing portion 54 and the powder discharge valve 21. Even if the pulverized fuel is fluidized by the fluidizing gas, the fluidity of the pulverized fuel is lowered when the pulverized fuel enters the powder delivery pipe 31 from the feed tank 11, and obstruction becomes likely to occur in the powder discharge valve 21. If the pulverized fuel is refluidized in the powder delivery pipe 31, however, it is possible to prevent the powder discharge valve 21 from being obstructed. Furthermore, if the powder refluidizing portion 57 is connected to the powder discharge valve 21 as described above, the pulverized fuel is refluidized immediately above the powder discharge valve 21, which can further prevent the powder discharge valve 21 from being obstructed.

Furthermore, the controller 60 generates a control signal on the aperture of the internal pressure control valve 22 on the basis of the information in the memory 61 and the information from the pressure indicators 43 and 49 and sends the control signal to the internal pressure control valve indicator 42. The internal pressure control valve indicator 42 adjusts the initial aperture of the internal pressure control valve 22 on the basis of the control signal from the controller 60. As a result of adjusting the aperture of the internal pressure control valve 22, the pressure in the feed tank 11 is adjusted to achieve a predetermined value, bringing the differential pressure between the pressure in the carrier gas main pipe 33 and the pressure in the powder delivery pipe 31 into a predetermined range. Although the pressure in the feed tank 11 is adjusted to bring the differential pressure between the pressure in the carrier gas main pipe 33 and the pressure in the powder delivery pipe 31 into a predetermined range in this example, the pressure in the feed tank 11 may be adjusted to bring the differential pressure between the pressure in the feed tank 11 and the pressure in the carrier gas main pipe 33 or the differential pressure between the pressure in the feed tank 11 and the pressure in the powder delivery pipe 31 into the predetermined range.

<Calculation Step S6>

The load cell 45 connected to the feed tank 11 outputs a signal on the load applied by the feed tank 11 to the load cell 45, and this signal is input into the weight indicator/controller 46, which in turn outputs a signal containing information on the load applied by the feed tank 11 to the load cell 45. The signal output from the weight indicator/controller 46 is input to and received by the controller 60.

The pressure indicator 78 connected to the powder supply pipe 70 detects the pressure in the expansion/contraction part 71 and outputs a signal containing information on the pressure in the expansion/contraction part 71. This signal is input to and received by the controller 60. Although the pressure indicator 78 directly detects the pressure in the powder supply pipe 70, the pressure indicator 78, which is connected between the closing valve 76 and the expansion/contraction part 71 of the powder supply pipe as described above, detects the pressure in the expansion/contraction part 71 by detecting the pressure in the powder supply pipe 70.

As described above, in this step, the output from the load cell 45 receiving the load of the feed tank 11 and the output from the pressure indicator 78 detecting the pressure in the expansion/contraction part 71 are first received by the controller 60, which detects the load received from the feed tank 11 by the load cell 45 and the pressure in the expansion/contraction part 71.

Subsequently, the controller 60 uses the load, which is applied by the feed tank 11 to the load cell 45 and received from the load cell 45, and the pressure in the expansion/contraction part 71, which is received from the pressure indicator 78, to obtain the weight of the pulverized fuel (powder weight) or the rate of change in powder weight in the feed tank 11 through computation.

The load applied by the feed tank 11 to the load cell 45 includes the weight of the feed tank 11, the powder weight in the feed tank 11, and a force with which the powder supply pipe 70 pushes the feed tank 11.

The weight of the feed tank 11 does not change and thus may be measured and input into the memory 61 in advance.

The force with which the powder supply pipe 70 pushes the feed tank 11 is, in principle, a value proportional to the product of the area of the aperture of the expansion/contraction part 71 at its lower end and the pressure in the expansion/contraction part 71. Since, however, the area of the aperture does not change, the force with which the powder supply pipe 70 pushes the feed tank 11 can be defined after all as a value proportional to the pressure in the expansion/contraction part 71. The area of the aperture of the expansion/contraction part 71 at its lower end does not change and thus may be measured and input into the memory 61 in advance. Furthermore, since the closing valve 76 is closed, the pressure in the expansion/contraction part 71 output from the pressure indicator 78 changes little even if when the pressure in the feed tank 11 changes.

In the state in which the closing valve 76 is closed, the controller 60 thus obtains the powder weight in the feed tank on the basis of a value obtained by subtracting a value proportional to the pressure in the expansion/contraction part 71 from the load applied by the feed tank 11 to the load cell 45, and further subtracting the weight of the feed tank 11. Specifically, with the load applied by the feed tank 11 to the load cell 45 defined as Wo, the area of the aperture of the expansion/contraction part 71 at its lower end defined as A, and the pressure in the expansion/contraction part 71 defined as P, the powder weight W in the feed tank 11 is expressed by expression (1) below. Note that, in expression (1) below, as the value proportional to the pressure in the expansion/contraction part 71, the pressure in the expansion/contraction part 71 is multiplied by the area of the aperture of the expansion/contraction part 71 at its lower end and a constant of proportionality.

$$W = W_o - KAP + \alpha \quad (1)$$

where K is a correction factor to correct the force obtained by the multiplication of the pressure in the expansion/contraction part 71 and the area of the expansion/contraction part 71 at its lower end to a value in the system of units for a value output by the load cell, and is a positive coefficient of proportionality. Furthermore, $\alpha$ is a tare subtraction correction value, which is specifically a correction value for subtracting the weight of the feed tank 11 and for other corrections, and may be positive or negative. The correction value $\alpha$ and the coefficient of proportionality K are constants determined in advance such that a derivative of the result W of expression (1) is the rate of change in powder weight.

By differentiating expression (1) with respect to time, the rate of change in powder weight can be obtained.

Alternatively, the rate of change in powder weight may be obtained without including the element of subtracting the weight of the feed tank 11 in $\alpha$ in the above expression but by obtaining a sum of the weight of the pulverized fuel in the feed tank 11 and the weight of the feed tank 11 and then differentiating the resultant value with respect to time. In this case, the weight of the feed tank 11 does not change as described above, and thus only the value for $\alpha$ in expression (1) changes. The same result will thus be obtained by obtaining the rate of change in powder weight from the powder weight in the feed tank 11 and by obtaining the rate of change in powder weight from the sum of the weight of feed tank 11 and the powder weight in the feed tank 11.

Note that the calculation step S6 is preferably performed after the pressure in the expansion/contraction part 71 is controlled in the pressure control step S5 and the change in the pressure in the expansion/contraction part 71 has become within the predetermined range from the set pressure. Thus, the controller 60 preferably obtains the powder weight or the rate of change in powder weight after the closing valve 76 and the powder supply valve 75 are closed and the change in pressure in the expansion/contraction part 71 has become within the predetermined range.

The pressure in the expansion/contraction part 71 may change for a while after the closing valve 76 and the powder supply valve 75 are closed owing to a change in the pressure in the expansion/contraction part 71 immediately before closing the closing valve 76 and the powder supply valve 75. In such a case, the expansion/contraction part 71 may expand and contract with a delay with respect to the change in the pressure in the expansion/contraction part 71. The powder weight in the feed tank 11 or the rate of change in the powder weight can thus be obtained more accurately and the flow rate of the supplied pulverized fuel can be controlled more accurately in the flow control step S7 by obtaining the powder weight or the rate of change in the powder weight after the pressure in the expansion/contraction part 71 has become within the predetermined range as described above.

Note that, in this step, the powder weight or the rate of change in powder weight may be obtained by using the pressure in the expansion/contraction part 71 detected by the pressure indicator 78 as described above, but may alternatively be obtained by using the pressure stored in the memory 61 used in the pressure control step S5 since the pressure input from the pressure indicator 78 to the controller should be equal to the pressure in the expansion/contraction part 71 controlled in the pressure control step S5. Also in this case, the pressure in the expansion/contraction part is used in the calculation.

<Flow Rate Control Step S7>

After the powder weight in the feed tank 11 or the rate of change in the powder weight is obtained in the calculation step S6, the controller 60 generates a control signal on the basis of this result by using, as needed, the information in the memory 61, a signal from the pressure indicator 43, a signal from the pressure indicator 49, and a signal from the powder flowmeter 40, and outputs this control signal to the internal pressure control valve indicator 42 and the powder discharge valve indicator 41 to adjust the aperture of the internal pressure control valve 22 and the powder discharge valve 21. The flow rate of the pulverized fuel to be supplied to the powder delivery pipe 31 is then directly controlled by the aperture of the powder discharge valve 21, and the aperture of the internal pressure control valve 22 is adjusted to adjust the pressure in the feed tank 11, which adjusts the differential pressure between the pressure in the carrier gas main pipe 33 and the pressure in the powder delivery pipe 31. This finely adjusts the flow rate of the pulverized fuel to be supplied to the powder delivery pipe 31. Note that the differential pressure between the pressure in the feed tank 11 and the pressure in the carrier gas main pipe 33 or the differential pressure between the pressure in the feed tank 11 and the pressure in the powder delivery pipe 31 may be adjusted by adjusting the pressure in the feed tank 11 to finely adjust the flow rate of the pulverized fuel to be supplied to the powder delivery pipe 31.

The calculation step S6 and the flow rate control step S7 described above are repeated to control the flow rate of the pulverized fuel supplied from the feed tank 11. Where necessary, the pressure control step S5 may be performed during the repetition of the calculation step S6 and the flow rate control step S7.

<First Opening Step S8>

Subsequently, after a predetermined amount of pulverized fuel is supplied from the feed tank 11 to the combustion furnace 100, the controller 60 performs control to make the pressure in the feed tank 11 and the pressure in the powder supply pipe 70 including the expansion/contraction part 71 and between the powder supply valve 75 and the closing valve 76 according to a predetermined input made by the operator through the input means or a program recorded in advance in the memory 61. Specifically, the controller 60 sends a control signal to the internal pressure control valve indicator 84 to adjust the aperture of the internal pressure control valve 82 so that the pressure in the powder supply pipe 70 obtained from the pressure indicator 78 becomes equal to the pressure in the feed tank 11 obtained from the pressure indicator 48. In this adjustment, the aperture of the internal pressure control valve 22 may be adjusted so that the pressure in the feed tank 11 obtained from the pressure indicator 48 becomes equal to the pressure in the powder supply pipe 70 obtained from the pressure indicator 78. If the pressure in the feed tank 11 is adjusted, however, this may affect the flow rate of the pulverized fuel supplied from the feed tank 11 to the powder delivery pipe 31, and it is thus preferable to adjust the pressure in the powder supply pipe 70 by adjusting the aperture of the internal pressure control valve 82 as described above. As a result, the pressure in the feed tank 11 and the pressure in the powder supply pipe 70 become equal.

The controller 60 then sends a control signal indicating to open the closing valve 76 to the closing valve indicator 77, and the closing valve indicator 77 opens the closing valve 76 on the basis of the control signal from the controller 60. As a result, the inside of the feed tank 11 and the inside of the powder supply pipe 70 including the expansion/contraction part 71 are spatially connected again.

As described above, in the present embodiment, the pressure in the expansion/contraction part 71 and the pressure in the feed tank 11 are made equal when the closing valve 76 is opened, which can prevent the pressure in the expansion/contraction part 71 from changing immediately after the closing valve 76 is opened. It is thus possible to prevent calculation of the powder weight in the feed tank 11 or the rate of change in the powder weight from being inaccurate and to prevent the flow rate of the supplied pulverized fuel from being inaccurate as a result of sudden expansion/contraction of the expansion/contraction part 71 by opening the closing valve 76.

<Second Opening Step S9>

Subsequently, the controller 60 performs control to make the pressure in the pressure equalizing tank 12 and the pressure in the feed tank 11 equal. Specifically, the controller 60 sends a control signal to the internal pressure control valve indicator 94 to adjust the aperture of the internal pressure control valve 92 so that the pressure in the pressure equalizing tank 12 obtained from the pressure indicator 88 becomes equal to the pressure in the feed tank 11 obtained from the pressure indicator 48. Note that, in this control, the pressure in the powder supply pipe 70 obtained from the pressure indicator 78 may be used instead of the pressure in the feed tank 11 obtained from the pressure indicator 48 since the pressures in the feed tank 11 and in the powder supply pipe 70 are equal. Furthermore, in this adjustment, the aperture of the internal pressure control valve 22 or the internal pressure control valve 82 may be adjusted so that the pressure in the feed tank 11 obtained from the pressure indicator 48 or the pressure in the powder supply pipe 70 obtained from the pressure indicator 78 becomes equal to the pressure in the pressure equalizing tank 12 obtained from the pressure indicator 88. If the pressure in the feed tank 11 is adjusted, however, this may affect the flow rate of the pulverized fuel supplied from the feed tank 11 to the powder delivery pipe 31, and it is thus preferable to adjust the pressure in the pressure equalizing tank 12 by adjusting the aperture of the internal pressure control valve 92 as described above.

Subsequently, the powder supply valve 75 is opened. Specifically, the controller 60 sends a control signal indicating to open the powder supply valve 75 to the powder supply valve indicator 79, and the powder supply valve indicator 79 opens the powder supply valve 75 on the basis of the control signal from the controller 60. As a result, the inside of the pressure equalizing tank 12 and the inside of the feed tank 11 are spatially connected through the powder supply pipe 70.

In general, the pressure equalizing tank and the feed tank have much larger volumes than the powder supply pipe. Thus, if the closing valve 76 is opened and the pressure in the expansion/contraction part 71 slightly changes as in the present embodiment, the change in the pressure in the expansion/contraction part 71 is absorbed by the pressure equalizing tank 12 having a pressure equal to that of the feed tank 11 as a result of opening the powder supply valve 75. Thus, even if the pressure in the expansion/contraction part 71 changes, the change in the pressure in the expansion/contraction part 71 can be reduced. Furthermore, since no pressure change occurs in the feed tank 11 due to the pressure difference between the pressure in the pressure equalizing tank 12 and the pressure in the feed tank 11, the pressure in the expansion/contraction part 71 is less likely to change. Thus, the amount of the pulverized fuel in the feed tank 11 can be accurately obtained in a case where the closing valve 76 is closed immediately after supplying of powder from the pressure equalizing tank into the feed tank 11 is finished or in a case where the closing valve 76 is closed before the pressure in the feed tank 11 changes.

The pulverized fuel in the pressure equalizing tank 12 is then supplied into the feed tank 11 via the powder supply pipe 70, and part of this step will be at least part of the supply step S1. As described above, the operation then proceeds from the supply step S1 to the first closing step S2 as described above.

As described above, according to the powder supply device 1 of the present embodiment, the closing valve 76 is provided between the expansion/contraction part 71 and the feed tank 11, and the rate of change in the powder weight in the feed tank 11 is obtained on the basis of a value obtained by subtracting a force pushing the feed tank 11 downward by the expansion of the expansion/contraction part 71 due to its internal pressure from the load applied by the feed tank 11 to the load cell 45 in a state in which the closing valve 76 is tightened. In this manner, it is possible to prevent the pressure in the expansion/contraction part 71 from changing even when the pressure in the feed tank 11 changes, and to prevent the rate of change in the powder weight caused by a change in the pressure in the expansion/contraction part 71 from being erroneously obtained. Since the flow rate of the pulverized fuel to be supplied to the outside of the feed tank 11 is controlled on the basis of the rate of change in the powder weight in the feed tank 11 obtained accurately, the flow rate of the pulverized fuel to be supplied can be controlled with improved accuracy.

Furthermore, in the powder supply device 1 of the present embodiment, the closing valve 76 and the powder supply valve 75 are closed so that the spaces in the feed tank 11 and the pressure equalizing tank 12 are separated from the space in the powder supply pipe 70 (in expansion/contraction part 71), and thus the pressure in the expansion/contraction part 71 changes little after the powder supply valve 75 is closed unless the internal pressure control valve 82 is controlled to adjust the internal pressure gas from the internal pressure gas supply pipe 81. It is thus possible to obtain the powder weight or the rate of change in the powder weight in the feed tank 11 more accurately and the flow rate of the supplied pulverized fuel can be controlled more accurately than performing the calculation step S6 in a state in which the powder supply valve 75 is opened.

Furthermore, in the operation described above, the pressure in the expansion/contraction part 71 is set to the predetermined set pressure S in the pressure control step S5 and the powder weight or the rate of change in the powder weight is obtained in the calculation step S6 in a state in which the spaces in the feed tank 11 and the pressure equalizing tank 12 are separated from the space in the powder supply pipe 70 (in the expansion/contraction part 71). As a result of bringing the pressure in the expansion/contraction part 71 to the set pressure S, the force pushing the feed tank 11 downward caused by the pressure in the expansion/contraction part 71 can be estimated in advance. It is thus possible to easily determine the coefficient of proportionality K by which the pressure in the expansion/contraction part 71 is to be multiplied for obtaining the powder weight or the rate of change in the powder weight in the calculation step S6. It is thus possible to easily obtain the powder weight or the rate of change in the powder weight.

(Second Operation of Powder Supply Device 1)

Next, second operation of the powder supply device 1 will be described. Note that redundant description of operations identical or equivalent to those in the first operation will not be repeated unless description is particularly made.

In this operation, the pressure control step S5, the calculation step S6, and the flow rate control step S7 are different from those in the first operation.

<Pressure Control Step S5>

Figure 5:
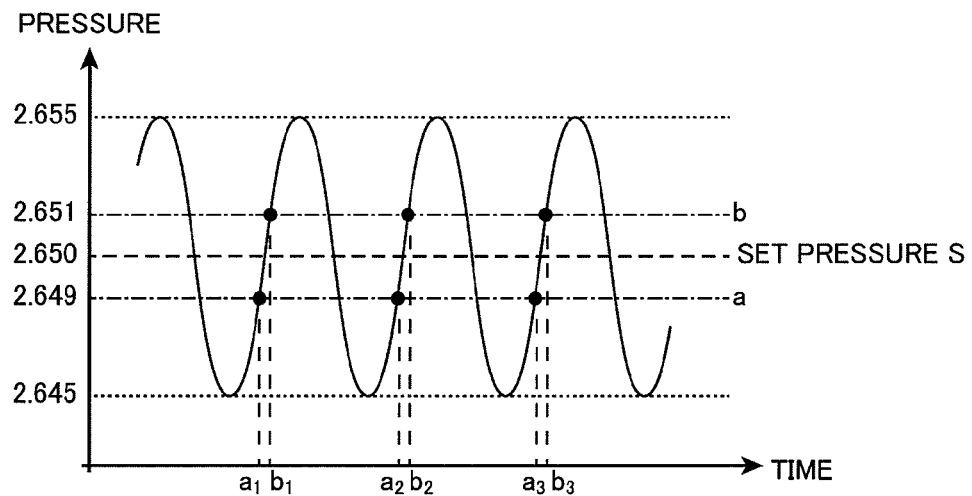
FIG. 5 is a graph showing a variation with time of the pressure in an expansion/contraction part and the detected pressure in second operation of the powder supply device.

The controller 60 controls the pressure in the expansion/contraction part 71 in a state in which the closing valve 76 and the powder supply valve 75 are closed. FIG. 5 is a graph showing the variation with time of the pressure in the expansion/contraction part 71 and the detected pressure. As shown in FIG. 5, in this operation, the controller sends a control signal to the internal pressure control valve indicator 84 to control the internal pressure control valve 82 so that the pressure in the expansion/contraction part 71 changes periodically upward and downward by an equal pressure with respect to the predetermined set pressure S. The aperture of the internal pressure control valve 82 repeatedly becomes larger and smaller according to the control of the controller 60 to periodically change the pressure in the expansion/contraction part 71 as shown in FIG. 5.

The set pressure S is a constant pressure stored in the memory 61, and the upper limit and the lower limit of the pressure are stored in the memory 61, the upper limit being above the set pressure S by the certain value and the lower limit being below the set pressure S by the certain value. For example, as shown in FIG. 5, the set pressure S is 2.650 MPa, the pressure at the upper limit is 2.655 MPa, and the pressure at the lower limit is 2.645 MPa.

The pressure in the expansion/contraction part 71 is controlled to periodically change in this manner.

<Calculation Step S6>

Next, in this step, the output from the load cell 45 receiving the load of the feed tank 11 and the output from the pressure indicator 78 detecting the pressure in the expansion/contraction part 71 are received by the controller 60, which detects the load received from the feed tank 11 by the load cell 45 and the pressure in the expansion/contraction part 71 similarly to the first operation. In this operation, however, since the pressure in the expansion/contraction part 71 is controlled to periodically change in the pressure control step S5, the pressure in the expansion/contraction part 71 detected by the pressure indicator 78 also changes periodically, and the load applied by the feed tank 11 to the load cell 45 is also affected by the periodically changing pressure in the expansion/contraction part 71.

Subsequently, at time $a_1$ when the pressure indicator 78 indicates a pressure a lower than the set pressure S by a certain value while the pressure in the expansion/contraction part 71 increases, the controller 60 calculates the powder weight or the rate of change in the powder weight in the feed tank 11 through computation similarly to the calculation step S6 of the first operation described above. The controller 60 then stores the thus obtained powder weight or rate of change in the powder weight in the memory 61.

Subsequently, at time $b_1$ when the pressure indicator 78 indicates a pressure b higher than the set pressure S by the certain value while the pressure in the expansion/contraction part 71 increases, the controller 60 calculates the powder weight or the rate of change in the powder weight in the feed tank 11 through computation similarly to the calculation step S6 of the first operation described above. The controller 60 then stores the thus obtained powder weight or rate of change in the powder weight in the memory 61.

The pressure a is a pressure between the set pressure S and the pressure at the lower limit, the pressure b is a pressure between the set pressure S and the pressure at the upper limit, and the difference between the set pressure S and the pressure a and the difference between the pressure b and the set pressure S are equal to each other. The pressures a and b are stored in the memory 61.

<Flow Rate Control Step S7>

After the powder weight or the rate of change in the powder weight is obtained at time $a_1$ when the pressure indicator 78 indicates the pressure a lower than the set pressure S by the certain value and at time $b_1$ when the pressure indicator 78 indicates the pressure b higher than the set pressure S by the certain value in the calculation step S6, the controller 60 obtains an average of the obtained powder weights or an average of the obtained rates of change in the powder weight. The controller 60 then controls the flow rate of the pulverized fuel supplied into the powder delivery pipe 31 similarly to the first operation on the basis of the obtained average of the powder weights or the obtained average of the rates of change in the powder weight. In this case, the flow rate of the pulverized fuel supplied into the powder delivery pipe 31 is controlled by using the powder weights or the average of the powder weights at time $a_1$ and time $b_1$ until the powder weights or the rates of change in the powder weight are obtained next time.

In this operation, as shown in FIG. 5, at next time $a_2$ when the pressure indicator 78 indicates the pressure a lower than the set pressure S by the certain value while the pressure in the expansion/contraction part 71 increases, the controller 60 obtains the powder weight or the rate of change in the powder weight in the feed tank 11 through computation. Furthermore, at next time $b_2$ when the pressure indicator 78 indicates the pressure b higher than the set pressure S by the certain value while the pressure in the expansion/contraction part 71 increases, the controller 60 obtains the powder weight or the rate of change in the powder weight in the feed tank 11 through computation. When the powder weights and the rates of change in the powder weight at time $a_2$ and time $b_2$ are obtained, the controller 60 then obtains an average of the obtained powder weights or an average of the obtained rates of change in the powder weight, and controls the flow rate of the pulverized fuel supplied into the powder delivery pipe 31 similarly to the above on the basis of the obtained average of the powder weights or the obtained average of the rates of change in the powder weight.

Such calculation step S6 and flow rate control step S7 are repeated at next time $a_3$, next time $b_3$, and subsequent times when the pressure a and the pressure b are indicated while the pressure in the expansion/contraction part 71 increases, to control the flow rate of the pulverized fuel supplied from the feed tank 11. Specifically, the controller 60 obtains the powder weights or the rates of change in the powder weight when the pressure indicator 78 indicates the pressure a lower than the set pressure S by the certain value and when the pressure indicator 78 indicates the pressure b higher than the set pressure S by the certain value while the pressure in the expansion/contraction part 71 increases, and controls the flow rate of the pulverized fuel supplied to outside of the feed tank 11 on the basis of the average of the obtained powder weights or the average of the obtained rates of change in the powder weight.

Figure 6:
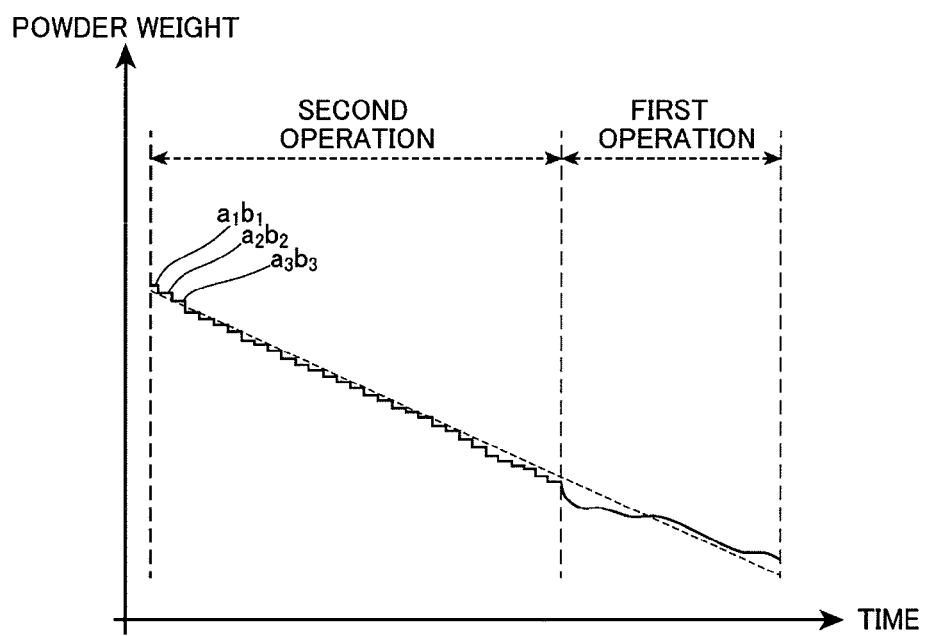
FIG. 6 is a graph showing a variation with time of the weight of powder in a feed tank.

FIG. 6 is a graph showing a variation with time of the weight of the pulverized fuel in the feed tank 11 in a state in which the pulverized fuel in the feed tank 11 is supplied into the powder delivery pipe 31 at a certain flow rate, in which the second operation is first performed for a certain period and the first operation is then performed. In FIG. 6, the point indicated by $a_1b_1$ refers to the average of the powder weight obtained at time $a_1$ and the powder weight obtained at time $b_1$, the point indicated by $a_2b_2$ refers to the average of the powder weight obtained at time $a_2$ and the powder weight obtained at time $b_2$, and the point indicated by $a_3b_3$ refers to the average of the powder weight obtained at time $a_3$ and the powder weight obtained at time $b_3$.

Under the condition of FIG. 6, since the pulverized fuel in the feed tank 11 is supplied to the powder delivery pipe 31 at the certain flow rate, the powder weight decreases at a certain rate. FIG. 6 shows a stepwise decrease in the obtained weight of the pulverized fuel in the feed tank 11 at a certain rate according to the second operation. In contrast, FIG. 6 shows that the obtained weight of the pulverized fuel in the feed tank 11 is slightly unstable according to the first operation. It is thus possible to supply powder more stably according to the second operation.

This is deemed to be due to the following. When control is performed like the second operation, an error contained in the pressure detected by the pressure indicator 78 when the pressure in the expansion/contraction part 71 is detected to be the pressure a lower than the set pressure S by the certain value and an error contained in the pressure detected by the pressure indicator 78 when the pressure in the expansion/contraction part 71 is detected to be the pressure b higher than the set pressure S by the certain value tend to be opposite values. Thus, as a result of averaging the powder weights and the rates of change in the powder weight obtained with the errors, the errors having opposite values to each other are offset by each other, which can prevent the errors from being contained in the obtained average of the powder weights or the rates of change in the powder weight.

Furthermore, the controller 60 obtains the powder weights or the rates of change in the powder weight when the pressure indicator 78 indicates the pressure a and the pressure b lower and higher, respectively, than the set pressure S by the predetermined pressure while the pressure in the expansion/contraction part 71 increases. As a result of such control, even if an error contained when the pressure in the expansion/contraction part 71 is detected to be the pressure a lower than the set pressure S by the certain value and an error contained when the pressure in the expansion/contraction part is detected to be the pressure b higher than the set pressure S by the certain value are not offset by each other, the errors that are not offset by each other are likely to be errors having the same tendency. Thus, it is possible to prevent errors having different tendencies from being contained each time the pressure indicator detects the pressure in the expansion/contraction part, and to obtain the powder weight or the rate of change in the powder weight more stably.

Furthermore, the present inventors have found that, even if the pressure indicator 78 detects the pressure in the expansion/contraction part 71 containing errors, the pressure indicator 78 can detect the pressure in the expansion/contraction part 71 with smaller errors when the pressure in the expansion/contraction part 71 changes than when the pressure in the expansion/contraction part 71 does not change in general. Moreover, since the pressure in the expansion/contraction part 71 changes periodically upward and downward by an equal pressure with respect to the set pressure, the average of the force of the expansion/contraction part 71 pushing the feed tank 11 can be defined as the force of the expansion/contraction part 71 pushing the feed tank when the pressure in the expansion/contraction part 71 is the set pressure S. With the control as described above, it is thus possible to obtain the powder weight or the rate of change in the powder weight in the feed tank more accurately, and to control the flow rate of the supplied pulverized fuel more accurately.

Although the controller 60 obtains the powder weight or the rate of change in the powder weight when the pressure indicator 78 indicates the pressure a and the pressure indicator 78 indicates the pressure b while the pressure in the expansion/contraction part 71 increases in this operation, the controller 60 may obtain the powder weight or the rate of change in the powder weight when the pressure indicator 78 indicates the pressure a and the pressure indicator 78 indicates the pressure b while the pressure in the expansion/contraction part 71 decreases.

(Third Operation of Powder Supply Device 1)

Next, third operation of the powder supply device 1 will be described. Note that redundant description of operations identical or equivalent to those in the second operation will not be repeated unless description is particularly made.

Figure 7:
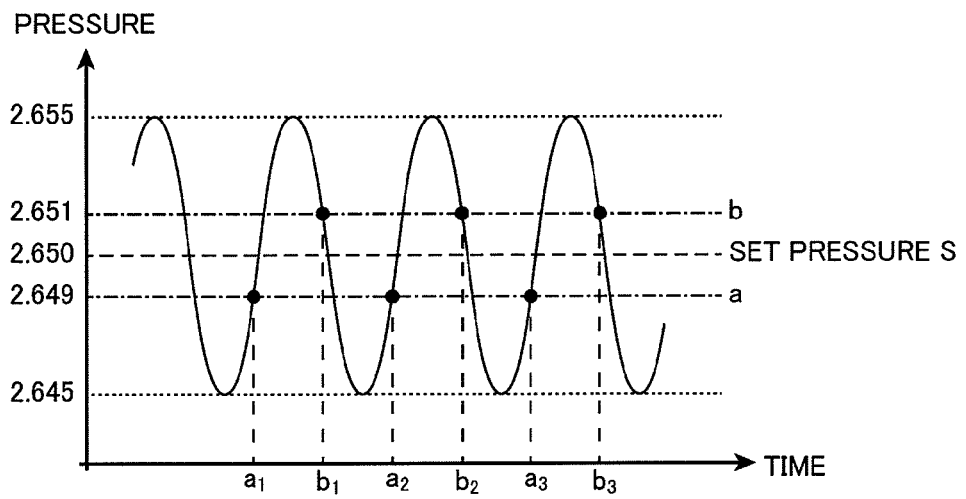
FIG. 7 is a graph showing a variation with time of the pressure in the expansion/contraction part and the detected pressure in third operation of the powder supply device.

In this operation, the calculation step S6 is different from that in the second operation. FIG. 7 is a graph showing the variation with time of the pressure in the expansion/contraction part 71 and the detected pressure in this operation.

<Calculation Step S6>

In this step of this operation, the output from the load cell 45 receiving the load of the feed tank 11 and the output from the pressure indicator 78 detecting the pressure in the expansion/contraction part 71 are received by the controller 60, which detects the load received from the feed tank 11 by the load cell 45 and the pressure in the expansion/contraction part 71 similarly to the second operation.

Subsequently, similarly to the second operation, at time $a_1$ when the pressure indicator 78 indicates a pressure a lower than the set pressure S by a certain value while the pressure in the expansion/contraction part 71 increases, the controller 60 calculates the powder weight or the rate of change in the powder weight in the feed tank 11 through computation. The controller 60 then stores the thus obtained powder weight or rate of change in the powder weight in the memory 61.

Subsequently, in this operation, at time $b_1$ when the pressure indicator 78 indicates a pressure b higher than the set pressure S by the certain value while the pressure in the expansion/contraction part 71 decreases, unlike the second operation, the controller 60 calculates the powder weight or the rate of change in the powder weight in the feed tank 11 through computation similarly to the calculation step S6 of the first operation described above. The controller 60 then stores the thus obtained powder weight or rate of change in the powder weight in the memory 61.

Note that the pressure a and the pressure b are the same as the pressure a and the pressure b, respectively, in the second operation, and stored in the memory 61.

Subsequently, in the flow rate control step S7 similarly to the second operation, the controller 60 obtains the average of the powder weights or the rates of change in the powder weight at time $a_1$ when the pressure indicator 78 indicates the pressure a lower than the set pressure S by the certain value and at time $b_1$ when the pressure indicator 78 indicates the pressure b higher than the set pressure S by the certain value. The controller 60 then controls the flow rate of the pulverized fuel supplied into the powder delivery pipe 31 similarly to the second operation on the basis of the obtained average of the powder weights or the obtained average of the rates of change in the powder weight.

In this operation, as shown in FIG. 7, at next time $a_2$ when the pressure indicator 78 indicates the pressure a lower than the set pressure S by the certain value while the pressure in the expansion/contraction part 71 increases, and at next time $b_2$ when the pressure indicator 78 indicates the pressure b higher than the set pressure S by the certain value while the pressure in the expansion/contraction part 71 decreases, the controller 60 obtains the powder weight or the rate of change in the powder weight in the feed tank 11 through computation. When the powder weights and the rates of change in the powder weight at time $a_2$ and time $b_2$ are obtained, the controller 60 then obtains an average of the obtained powder weights or an average of the obtained rates of change in the powder weight, and controls the flow rate of the pulverized fuel supplied into the powder delivery pipe 31 similarly to the above. Also in this operation, similarly to the second operation, the calculation step S6 and the flow rate control step S7 are repeated at next time $a_3$, next time $b_3$, and subsequent times when the pressure a and the pressure b are indicated while the pressure in the expansion/contraction part 71 increases, to control the flow rate of the pulverized fuel supplied from the feed tank 11. Specifically, the controller 60 obtains the powder weight or the rate of change in the powder weight when the pressure indicator 78 indicates the pressure a lower than the set pressure S by the certain value while the pressure in the expansion/contraction part 71 increases, obtains the powder weight or the rate of change in the powder weight when the pressure indicator 78 indicates the pressure b higher than the set pressure S by the certain value while the pressure in the expansion/contraction part 71 decreases, and controls the flow rate of the pulverized fuel supplied to outside of the feed tank 11 on the basis of the average of the obtained powder weights or the average of the obtained rates of change in the powder weight.

Note that, in this operation, the controller 60 may obtain the powder weight or the rate of change in the powder weight when the pressure indicator 78 indicates the pressure a lower than the set pressure S by the certain value while the pressure in the expansion/contraction part 71 decreases, and obtain the powder weight or the rate of change in the powder weight when the pressure indicator 78 indicates the pressure b higher than the set pressure S by the certain value while the pressure in the expansion/contraction part 71 increases.

According to this operation, an error contained when the pressure indicator 78 detects the pressure in the expansion/contraction part 71 to be the pressure lower than the set pressure S by the certain value and an error contained when the pressure indicator 78 detects the pressure in the expansion/contraction part 71 to be the pressure higher than the set pressure S by the certain value tend to be offset by each other in an average of the powder weights and an average of the rates of change in the powder weight. This is deemed to be due to the following. An error contained when the pressure is detected while the pressure in the expansion/contraction part 71 increases and an error contained when the pressure is detected while the pressure in the expansion/contraction part 71 decreases tend to have opposite values. Thus, with the second operation, even when errors that cannot be offset by each other are contained in an error contained when the pressure lower than the set pressure S by the certain value and an error contained when the pressure higher than the set pressure S by the certain value, these errors can be further reduced.

Although the controller 60 obtains the powder weight or the rate of change in the powder weight when the pressure indicator 78 indicates the pressure a while the pressure in the expansion/contraction part 71 decreases and obtains the powder weight or the rate of change in the powder weight when the pressure indicator 78 indicates the pressure b while the pressure in the expansion/contraction part 71 increases in this operation, the controller 60 may obtain the powder weight or the rate of change in the powder weight when the pressure indicator 78 indicates the pressure a while the pressure in the expansion/contraction part 71 increases and obtain the powder weight or the rate of change in the powder weight when the pressure indicator 78 indicates the pressure b while the pressure in the expansion/contraction part 71 decreases.

(Fourth Operation of Powder Supply Device 1)

Next, fourth operation of the powder supply device 1 will be described. Note that redundant description of operations identical or equivalent to those in the second operation will not be repeated unless description is particularly made.

In this operation, the calculation step S6 and the flow rate control step S7 are different from those in the second operation. FIG. 7 is a graph showing the variation with time of the pressure in the expansion/contraction part 71 and the detected pressure in this operation.

<Calculation Step S6>

In this step of this operation, the output from the load cell 45 receiving the load of the feed tank 11 and the output from the pressure indicator 78 detecting the pressure in the expansion/contraction part 71 are received by the controller 60, which detects the load received from the feed tank 11 by the load cell 45 and the pressure in the expansion/contraction part 71 similarly to the second operation.

Subsequently, unlike the second operation, at time $s_1$ when the pressure indicator 78 indicates the set pressure S while the pressure in the expansion/contraction part 71 increases, the controller 60 calculates the powder weight or the rate of change in the powder weight in the feed tank 11 through computation. The controller 60 then stores the thus obtained powder weight or rate of change in the powder weight in the memory 61.

Subsequently, in the flow control step S7, the flow rate of the pulverized fuel supplied into the powder delivery pipe 31 is controlled on the basis of the powder weight or the rate of change in the powder weight at time $s_1$ until next time $s_2$ when the pressure indicator 78 indicates the set pressure S while the pressure in the expansion/contraction part 71 increases. After time $s_2$, the same calculation step S6 and flow rate control step S7 are repeated, in which the powder weight or the rate of change in the powder weight is obtained only when the pressure indicator 78 indicates the set pressure S while the pressure in the expansion/contraction part 71 increases, and the flow rate of the pulverized fuel supplied from the feed tank 11 is controlled on the basis of the obtained powder weight or the obtained rate of change in the powder weight.

According to this operation, it is not necessary to obtain the powder weight or the rate of change in the powder weight when the pressure indicator 78 indicates the pressure a lower than the set pressure S by the certain value and when the pressure indicator 78 indicates the pressure b higher than the set pressure S by the certain value and to obtain the average of the obtained powder weights or the obtained rates of change in the powder weight like the second operation and the third operation. The control of powder supplying is thus easier than the second operation and the third operation.

According to this operation, the powder weight or the rate of change in the powder weight is obtained while the pressure in the expansion/contraction part 71 increases through computation. Thus, even if the pressure indicator detects the pressure in the expansion/contraction part with an error contained in each detection, the errors are likely to have the same tendency. Hence, it is possible to prevent different errors to be contained each time the pressure indicator 78 detects the pressure in the expansion/contraction part 71, and to obtain the powder weight or the rate of change in the powder weight more stably. It is thus possible to control the flow rate of supplied pulverized fuel more stably.

Although the controller obtains the powder weight or the rate of change in the powder weight when the pressure indicator 78 indicates the set pressure S while the pressure in the expansion/contraction part 71 decreases, the controller may obtain the powder weight or the rate of change in the powder weight when the pressure indicator 78 indicates the set pressure S while the pressure in the expansion/contraction part 71 increases.

(Fifth Operation of Powder Supply Device 1)

Next, fifth operation of the powder supply device 1 will be described. Note that redundant description of operations identical or equivalent to those in the second operation will not be repeated unless description is particularly made.

Figure 8:
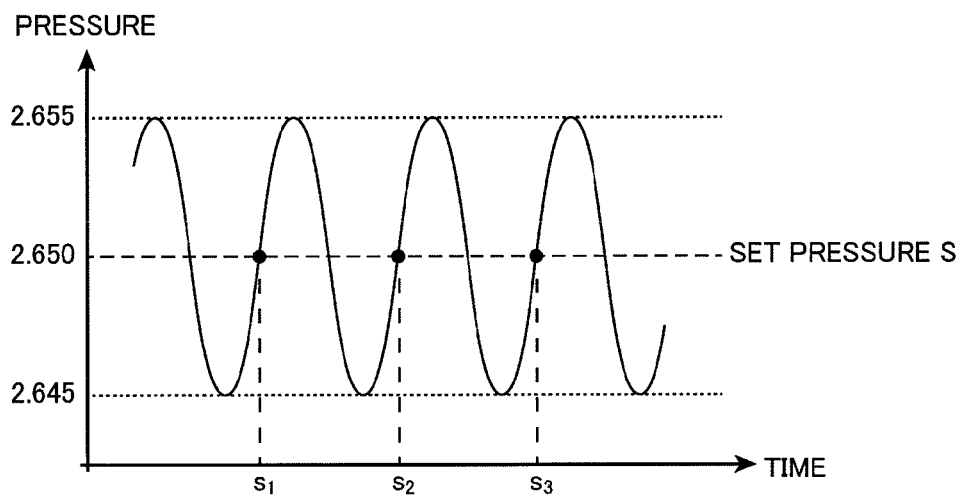
FIG. 8 is a graph showing a variation with time of the pressure in the expansion/contraction part and the detected pressure in fourth operation of the powder supply device.
Figure 9:
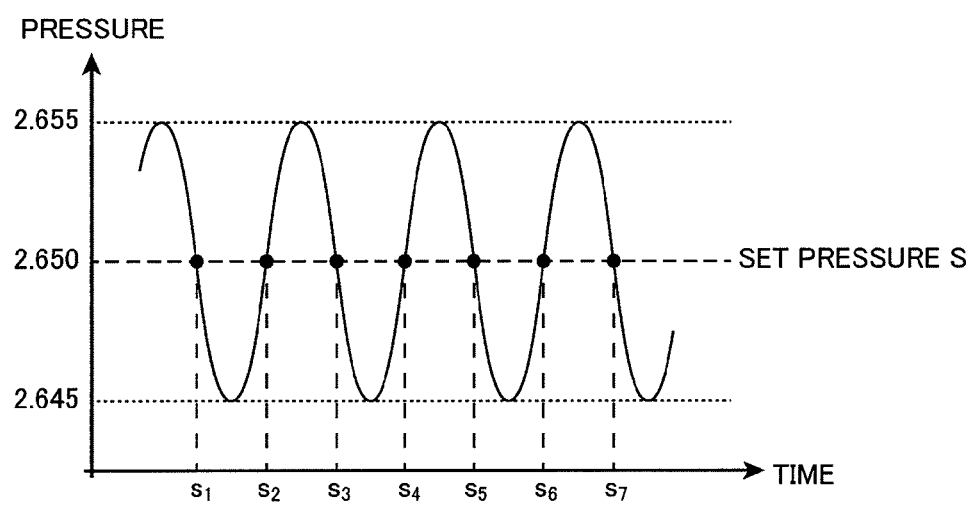
FIG. 9 is a graph showing a variation with time of the pressure in the expansion/contraction part and the detected pressure in fifth operation of the powder supply device.

In this operation, the calculation step S6 is mainly different from that in the fourth operation. FIG. 8 is a graph showing the variation with time of the pressure in the expansion/contraction part 71 and the detected pressure in this operation.

<Calculation Step S6>

In this step of this operation, the output from the load cell 45 receiving the load of the feed tank 11 and the output from the pressure indicator 78 detecting the pressure in the expansion/contraction part 71 are received by the controller 60, which detects the load received from the feed tank 11 by the load cell 45 and the pressure in the expansion/contraction part 71 similarly to the second operation.

Subsequently, similarly to the fourth operation, at time $s_1$ when the pressure indicator 78 indicates the set pressure S while the pressure in the expansion/contraction part 71 increases, the controller 60 calculates the powder weight or the rate of change in the powder weight in the feed tank 11 through computation. The controller 60 then stores the thus obtained powder weight or rate of change in the powder weight in the memory 61.

Subsequently, in the flow control step S7, the flow rate of the pulverized fuel supplied into the powder delivery pipe 31 is controlled on the basis of the powder weight or the rate of change in the powder weight at time $s_1$.

Subsequently, unlike the fourth operation, at time $s_2$ when the pressure indicator 78 indicates the set pressure S while the pressure in the expansion/contraction part 71 decreases, the controller 60 calculates the powder weight or the rate of change in the powder weight in the feed tank 11 through computation. The controller 60 then stores the thus obtained powder weight or rate of change in the powder weight in the memory 61.

Subsequently, in the flow control step S7, the flow rate of the pulverized fuel supplied into the powder delivery pipe 31 is controlled on the basis of the powder weight or the rate of change in the powder weight at time $s_2$.

After time $s_2$, the controller 60 alternately obtains the powder weight or the rate of change in the powder weight when the pressure indicator 78 indicates the set pressure S while the pressure in the expansion/contraction part 71 increases and the powder weight or the rate of change in the powder weight when the pressure indicator 78 indicates the set pressure S while the pressure in the expansion/contraction part 71 decreases, and controls the flow rate of the pulverized fuel supplied from the feed tank 11 on the basis of the obtained powder weight or the obtained rate of change in the powder weight.

According to this operation, even if the pressure indicator 78 detects the pressure in the expansion/contraction part 71 containing errors, an error contained when the set pressure S is detected while the pressure in the expansion/contraction part 71 increases and an error contained when the set pressure S is detected while the pressure in the expansion/contraction part 71 decreases tend to have opposite values. Thus, as a result of control as in this operation, an error having a certain tendency and an error having a tendency opposite thereto are alternately contained each time the pressure indicator 78 detects the pressure in the expansion/contraction part 71. Thus, the flow rate of the pulverized fuel controlled on the basis of the powder weight or the rate of change in the powder weight obtained while the pressure in the expansion/contraction part 71 increases and the flow rate of the pulverized fuel controlled on the basis of the powder weight or the rate of change in the powder weight obtained while the pressure in the expansion/contraction part 71 decreases can offset errors by each other, and the flow rate of the supplied pulverized fuel can be controlled more accurately.

While the present invention has been described above by reference to the embodiment as an example, the present invention is not limited thereto.

For example, although the pressure control step S5 is performed in the first operation, the pressure control step is not an essential condition. The powder weight or the rate of change in the powder weight, however, can be more easily obtained by performing the pressure control step S5 as described above. Furthermore, although the calculation step S6 is performed after the second closing step S3 of closing the powder supply valve 75 in the first operation, the second closing step is not an essential condition. In a case where the second closing step is not performed, the pressure control step S5 and the second opening step S9 are not performed.

Furthermore, although the pressure in the feed tank 11 and the pressure in the powder supply pipe 70 are controlled to be equal when the closing valve 76 is opened in the first opening step S8 of opening the closing valve 76 in the embodiment described above, such control is not essential but the pressure in the feed tank 11 and the pressure in the powder supply pipe 70 need not be made equal. Similarly, although the pressure in the pressure equalizing tank 12 and the pressure in the feed tank 11 are controlled to be equal when the powder supply valve 75 is opened in the second opening step S9 of opening the powder supply valve 75, such control is not essential but the pressure in the pressure equalizing tank 12 and the pressure in the feed tank 11 need not be made equal.

Furthermore, although the powder discharge valve 21 and the powder refluidizing portion 57 are provided in the middle portions of the powder delivery pipe 31 in the embodiment described above, the present invention is not limited thereto. For example, the powder discharge valve 21 and the powder refluidizing portion 57 may be connected directly to each other, such that the powder discharge valve 21 is connected to an end of the powder delivery pipe 31 and the powder refluidizing portion 57 is connected to the bottom portion of the feed tank 11. In this case, the powder delivery pipe 31 is indirectly connected to the feed tank 11.

Furthermore, although the powder supply device for supplying powder that is pulverized fuel, such as pulverized coal, has been described in the embodiment described above, the present invention is not limited thereto and can be applied to a powder supply device for supplying powder other than the pulverized fuel.

Furthermore, the pulverized fuel in the feed tank is fluidize by the fluidizing gas and further refluidized in the powder delivery pipe 31 in the embodiment described above, the fluidizing and refluidizing of the pulverized fuel are not essential.

Furthermore, although the flow rate of powder to be supplied to the outside of the feed tank 11 is controlled by using the rate of change in powder weight in the feed tank in the embodiment described above, the flow rate may be controlled by using the powder weight. In this case, the powder weight W in the feed tank 11 may be obtained by expression (1) in the calculation step S6 and the flow rate of powder to be supplied may be controlled on the basis of W in the flow rate control step S7.

Furthermore, in the calculation step S6 of the second operation and the third operation, the powder weight or the rate of change in the powder weight may be obtained by using the pressures a and b in the expansion/contraction part 71 detected by the pressure indicator 78 at time $a_1$ and $b_1$, respectively, as described above, but the pressures in the expansion/contraction part 71 used for the calculation may be the pressures a and b stored in the memory 61 because the pressures input to the controller from the pressure indicator 78 at times $a_1$ and $b_1$ are the pressures a and b, respectively. The same applies to the pressures after times $a_2$ and $b_2$. Furthermore, in the calculation step S6 of the fourth operation and the fifth operation, the powder weight or the rate of change in the powder weight may be obtained by using the pressure S in the expansion/contraction part 71 detected by the pressure indicator 78 at time $s_1$ as described above, but the pressure in the expansion/contraction part 71 used for the calculation may be the pressure S stored in the memory 61 because the pressure input to the controller from the pressure indicator 78 at time $s_1$ is the set pressure S. The same applies to the pressures after time $s_2$. Also in these cases, the pressure in the expansion/contraction part is used in the calculation.

INDUSTRIAL APPLICABILITY

As described above, the present invention provides a powder supply device and a powder supply method capable of controlling the flow rate of powder to be supplied with improved accuracy, which can be used to supply pulverized fuel in an energy plant, a blast furnace plant, and the like and to supply powder in a plant manufacturing food materials using powder.

REFERENCE SIGNS LIST 1 powder supply device
11 feed tank
12 pressure equalizing tank
21 powder discharge valve
22, 82, 92 internal pressure control valve
24 fluidizing gas valve
27 refluidizing gas valve
30 gas generator
31 powder delivery pipe
32, 81, 91 internal pressure gas supply pipe
33 carrier gas main pipe
34 fluidizing gas pipe
37 refluidizing gas pipe
40 powder flowmeter
41 powder discharge valve indicator
42, 84, 94 internal pressure control valve indicator
43, 48, 49, 78, 88 pressure indicator
44 fluidizing gas valve indicator
45 load cell
46 weight indicator/controller
47 refluidizing gas valve indicator
54 powder fluidizing portion
57 powder refluidizing portion
60 controller
61 memory
70 powder supply pipe
71 expansion/contraction part
71a large diameter portion
71b small diameter portion
73 ring
75 powder supply valve (second valve)
76 closing valve (first valve)
79 powder supply valve indicator
100 combustion furnace

The invention claimed is:

1. A powder supply device that supplies powder in a feed tank to outside of the feed tank, the powder supply device comprising:

a powder supply pipe having at least a part being an expansion/contraction part adapted to expand/contract in a vertical direction, connected to an upper portion of the feed tank, and adapted to supply the powder into the feed tank;

a first valve provided between the expansion/contraction part and the feed tank;

a load cell adapted to receive a load from the feed tank to detect the load;

a powder discharge valve configured to control a flow rate of the powder supplied from the feed tank to outside the feed tank;

an internal pressure control valve configured to control pressure inside the feed tank; and a controller, wherein the controller obtains a powder weight or a rate of change in the powder weight in the feed tank on the basis of a value obtained by subtracting a value proportional to a pressure in the expansion/contraction part from the load detected by the load cell in a state in which the first valve is closed, and controls the flow rate of powder to be supplied to outside of the feed tank by controlling the powder discharge valve and the internal pressure control valve on the basis of the powder weight or the rate of change in the powder weight.

2. The powder supply device according to claim 1, wherein the controller obtains the powder weight or the rate of change in the powder weight after the first valve is closed and a change in the pressure in the expansion/contraction part becomes within a predetermined range.

3. The powder supply device according to claim 1, further comprising:

a pressure equalizing tank connected to an end of the powder supply pipe opposite to an end on a side of the feed tank; and a second valve provided between the expansion/contraction part and the pressure equalizing tank, wherein the controller obtains the powder weight or the rate of change in the powder weight in a state in which the second valve is closed.

4. The powder supply device according to claim 3, further comprising an internal pressure control valve communicating with the expansion/contraction part, wherein the controller controls the internal pressure control valve so that the pressure in the expansion/contraction part becomes a predetermined set pressure in a state in which the first valve and the second valve are closed, and then obtains the powder weight or the rate of change in the powder weight.

5. The powder supply device according to claim 3, further comprising:

a pressure indicator configured to detect the pressure in the expansion/contraction part; and an internal pressure control valve communicating with the expansion/contraction part, wherein the controller controls the internal pressure control valve so that the pressure in the expansion/contraction part changes periodically upward and downward by an equal pressure with respect to a predetermined set pressure in a state in which the first valve and the second valve are closed, obtains the powder weight or the rate of change in the powder weight when the pressure indicator indicates a pressure lower than the set pressure by a certain value, and obtains the powder weight or the rate of change in the powder weight when the pressure indicator indicates a pressure higher than the set pressure by a certain value, and controls the flow rate of the powder to be supplied to outside of the feed tank on the basis of an average of the powder weight when the pressure indicator indicates the pressure lower than the set pressure by the certain value and the powder weight when the pressure indicator indicates the pressure higher than the set pressure by the certain value or an average of the rate of change in the powder weight when the pressure indicator indicates the pressure lower than the set pressure by the certain value and the rate of change in the powder weight when the pressure indicator indicates the pressure higher than the set pressure by the certain value.

6. The powder supply device according to claim 5, wherein the controller obtains the powder weight or the rate of change in the powder weight when the pressure indicator indicates the pressure lower than the set pressure by the certain value while the pressure in the expansion/contraction part either increases or decreases, and obtains the powder weight or the rate of change in the powder weight when the pressure indicator indicates the pressure higher than the set pressure by the certain value while the pressure in the expansion/contraction part either increases or decreases.

7. The powder supply device according to claim 5, wherein the controller obtains the powder weight or the rate of change in the powder weight when the pressure indicator indicates the pressure lower than the set pressure by the certain value while the pressure in the expansion/contraction part either increases or decreases, and obtains the powder weight or the rate of change in the powder weight when the pressure indicator indicates the pressure higher than the set pressure by the certain value while the pressure in the expansion/contraction part either decreases or increases.

8. The powder supply device according to claim 3, further comprising:

a pressure indicator configured to detect the pressure in the expansion/contraction part; and an internal pressure control valve communicating with the expansion/contraction part, wherein the controller controls the internal pressure control valve so that the pressure in the expansion/contraction part changes periodically upward and downward by an equal pressure with respect to a predetermined set pressure in a state in which the first valve and the second valve are closed, and obtains the powder weight or the rate of change in the powder weight when the pressure indicator indicates the set pressure.

9. The powder supply device according to claim 8, wherein the controller obtains the powder weight or the rate of change in the powder weight when the pressure indicator indicates the set pressure while the pressure in the expansion/contraction part either increases or decreases.

10. The powder supply device according to claim 8, wherein the controller alternately obtains the powder weight or the rate of change in the powder weight when the pressure indicator indicates the set pressure while the pressure in the expansion/contraction part increases and obtains the powder weight or the rate of change in the powder weight when the pressure indicator indicates the set pressure while the pressure in the expansion/contraction part decreases.

11. The powder supply device according to claim 3, wherein when the first valve is opened, the pressure in the expansion/contraction part and the pressure in the feed tank are made equal.

12. The powder supply device according to claim 3, wherein after the pressure in the pressure equalizing tank and the pressure in the feed tank are made equal and the first valve is opened, the second valve is opened.

13. The powder supply device according to claim 1, further comprising a powder delivery pipe conveying the powder supplied from the feed tank, wherein the powder discharge valve is in communication with the powder delivery pipe.

14. The powder supply device according to claim 1, wherein the internal pressure control valve and the powder discharge value are controlled by the controller so as to finely adjust the flow rate of the powder supplied from the feed tank.

15. A powder supply method for supplying powder in a feed tank to outside of the feed tank, the powder supply method comprising:
   supplying powder into the feed tank through a powder supply pipe having at least a part being an expansion/contraction part adapted to expand/contract in a vertical direction and connected to an upper portion of the feed tank;
   closing a first valve provided between the expansion/contraction part and the feed tank;
   obtaining a powder weight or a rate of change in the powder weight in the feed tank on the basis of a value obtained by subtracting a value proportional to a pressure in the expansion/contraction part from a load detected by a load cell adapted to receive a load from the feed tank in a state in which the first valve is closed; and
   controlling a flow rate of powder to be supplied to outside of the feed tank on the basis of the powder weight or the rate of change in the powder weight,
   wherein said controlling:
      controls a powder discharge valve coupled to a powder delivery pipe supplying the powder to outside the feed tank; and
      controls an internal pressure control valve configured to control pressure inside the feed tank.

16. The powder supply method according to claim 15, wherein the obtaining is performed after the pressure in the expansion/contraction part becomes within a predetermined range after the closing of the first valve.

17. The powder supply method according to claim 15, further comprising closing a second valve provided between a pressure equalizing tank connected to an end of the powder supply pipe opposite to an end thereof on a side of the feed tank and the expansion/contraction part, wherein the obtaining is performed in a state in which the second valve is closed.

18. The powder supply method according to claim 17, further comprising controlling an internal pressure control valve communicating with the expansion/contraction part so that the pressure in the expansion/contraction part becomes a predetermined set pressure in a state in which the first valve and the second valve are closed, wherein the obtaining is performed after the controlling the internal pressure.

19. The powder supply method according to claim 17, further comprising controlling an internal pressure control valve communicating with the expansion/contraction part so that the pressure in the expansion/contraction part changes periodically upward and downward by an equal pressure with respect to a predetermined set pressure in a state in which the first valve and the second valve are closed,
   wherein
   in the obtaining, the powder weight or the rate of change in the powder weight when a pressure indicator configured to detect the pressure in the expansion/contraction part indicates a pressure lower than the set pressure by a certain value is obtained, and the powder weight or the rate of change in the powder weight when the pressure indicator indicates a pressure higher than the set pressure by a certain value is obtained, and
   in the controlling the flow rate, the flow rate of the powder to be supplied to outside of the feed tank is controlled on the basis of an average of the powder weight when the pressure indicator indicates the pressure lower than the set pressure by the certain value and the powder weight when the pressure indicator indicates the pressure higher than the set pressure by the certain value or an average of the rate of change in the powder weight when the pressure indicator indicates the pressure lower than the set pressure by the certain value and the rate of change in the powder weight when the pressure indicator indicates the pressure higher than the set pressure by the certain value.

20. The powder supply method according to claim 19, wherein in the obtaining, the powder weight or the rate of change in the powder weight when the pressure indicator indicates the pressure lower than the set pressure by the certain value while the pressure in the expansion/contraction part either increases or decreases is obtained, and the powder weight or the rate of change in the powder weight when the pressure indicator indicates the pressure higher than the set pressure by the certain value while the pressure in the expansion/contraction part either increases or decreases is obtained.

21. The powder supply method according to claim 19, wherein in the obtaining, the powder weight or the rate of change in the powder weight when the pressure indicator indicates the pressure lower than the set pressure by the certain value while the pressure in the expansion/contraction part either increases or decreases is obtained, and the powder weight or the rate of change in the powder weight when the pressure indicator indicates the pressure higher than the set pressure by the certain value while the pressure in the expansion/contraction part either decreases or increases is obtained.

22. The powder supply method according to claim 17, further comprising controlling an internal pressure control valve communicating with the expansion/contraction part so that the pressure in the expansion/contraction part changes periodically upward and downward by an equal pressure with respect to a predetermined set pressure in a state in which the first valve and the second valve are closed, wherein in the obtaining, the powder weight or the rate of change in the powder weight when a pressure indicator configured to detect the pressure in the expansion/contraction part indicates the set pressure is obtained.

23. The powder supply method according to claim 22, wherein in the obtaining, the powder weight or the rate of change in the powder weight when the pressure indicator indicates the set pressure while the pressure in the expansion/contraction part either increases or decreases is obtained.

24. The powder supply method according to claim 22, wherein in the obtaining, obtaining the powder weight or the rate of change in the powder weight when the pressure indicator indicates the set pressure while the pressure in the expansion/contraction part increases and obtaining the powder weight or the rate of change in the powder weight when the pressure indicator indicates the set pressure while the pressure in the expansion/contraction part decreases are performed alternately.

25. The powder supply method according to claim 17, further comprising opening the first valve after the pressure in the expansion/contraction part and the pressure in the feed tank are made equal after the closing of the valve.

26. The powder supply method according to claim 17, further comprising:
   opening the first valve; and
   opening the second valve, wherein the opening of the second valve is performed after the pressure in the pressure equalizing tank and the pressure in the feed tank are made equal and after the opening of the first valve.

* * * * *